US010467011B2

(12) United States Patent
Rappoport et al.

(10) Patent No.: US 10,467,011 B2
(45) Date of Patent: Nov. 5, 2019

(54) THREAD PAUSE PROCESSORS, METHODS, SYSTEMS, AND INSTRUCTIONS

(71) Applicant: Intel Corporation, Santa Clara, CA (US)

(72) Inventors: Lihu Rappoport, Haifa (IL); Zeev Sperber, Zichron Yackov (IL); Michael Mishaeli, Zichron Yaakov (IL); Stanislav Shwartsman, Haifa (IL); Lev Makovsky, Haifa (IL); Adi Yoaz, Beer Yaakov (IL); Ofer Levy, Atlit (IL)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 14/336,596

(22) Filed: Jul. 21, 2014

(65) Prior Publication Data

US 2016/0019063 A1 Jan. 21, 2016

(51) Int. Cl.
G06F 9/38 (2018.01)
G06F 9/30 (2018.01)

(52) U.S. Cl.
CPC .............. G06F 9/3851 (2013.01); G06F 9/30 (2013.01); G06F 9/3009 (2013.01); G06F 9/30058 (2013.01)

(58) Field of Classification Search
CPC .... G06F 9/30; G06F 9/30058; G06F 9/30145; G06F 9/3009
See application file for complete search history.

(56) References Cited

U.S. PATENT DOCUMENTS

| 6,671,795 B1 * | 12/2003 | Marr ................... G06F 9/30083 712/220 |
| 6,687,838 B2 | 2/2004 | Orenstien et al. |
| 6,857,064 B2 | 2/2005 | Smith et al. |
| 6,889,319 B1 | 5/2005 | Rodgers et al. |
| 7,149,878 B1 * | 12/2006 | Jensen ................ G06F 9/30076 712/209 |
| 7,152,169 B2 | 12/2006 | Cooper et al. |

(Continued)

FOREIGN PATENT DOCUMENTS

EP 0827071 A2 3/1998

OTHER PUBLICATIONS

U.S. Appl. No. 23/942,534, filed Dec. 30, 2003, Marr, Deborah T., et al.

(Continued)

Primary Examiner — Benjamin P Geib
Assistant Examiner — William V Nguyen
(74) Attorney, Agent, or Firm — NDWE, LLP

(57) ABSTRACT

A processor of an aspect includes a decode unit to decode a thread pause instruction from a first thread. A back-end portion of the processor is coupled with the decode unit. The back-end portion of the processor, in response to the thread pause instruction, is to pause processing of subsequent instructions of the first thread for execution. The subsequent instructions occur after the thread pause instruction in program order. The back-end portion, in response to the thread pause instruction, is also to keep at least a majority of the back-end portion of the processor, empty of instructions of the first thread, except for the thread pause instruction, for a predetermined period of time. The majority may include a plurality of execution units and an instruction queue unit.

12 Claims, 16 Drawing Sheets

(56) References Cited

U.S. PATENT DOCUMENTS

| | | | |
|---|---|---|---|
| 7,159,133 B2 | 1/2007 | Orenstien et al. | |
| 7,451,296 B2 | 11/2008 | Marr et al. | |
| 7,774,626 B2 | 8/2010 | Fleming | |
| 8,464,035 B2* | 6/2013 | Dixon | G06F 1/3203 713/1 |
| 2004/0117604 A1 | 6/2004 | Marr et al. | |
| 2005/0223253 A1* | 10/2005 | Marchand | G06F 1/3203 713/322 |
| 2008/0059814 A1* | 3/2008 | Esliger | G06F 1/3203 713/300 |
| 2008/0228896 A1* | 9/2008 | Krig | G06F 13/385 709/212 |
| 2009/0077361 A1* | 3/2009 | Neiger | G06F 9/45533 712/241 |
| 2012/0017221 A1 | 1/2012 | Hankins et al. | |
| 2013/0198499 A1* | 8/2013 | Dice | G06F 9/30079 712/239 |

OTHER PUBLICATIONS

"Intel 64 and IA-32 Architectures Software Developer's Manual," Feb. 2014, pp. 1-2; vol. 1, 11-12; vol. 2B, 4-57; vol. 3A, 8-46, 8-49; vol. 3C, 24-10, 24-14-15, 25-3 (10 pages total), Combined vols. 1, 2A, 2B, 2C, 3A, 3B and 3C.

Office Action received for Korean Patent Application No. 10-2015-0085170, dated Oct. 11, 2016, 13 pages of Korean Office Action including 6 pages of English Translation.

Notice of Allowance and Search Report received for Taiwan Patent Application No. 104119283, dated Apr. 29, 2016, 4 pages of Taiwan Notice of allowance including 1 page of English Translation of Search Report.

Intel, "Intel 64 and IA-32 Architectures Software Developer's Manual", vol. 1: Basic Architecture, Order No. 253665-040US, Oct. 2011, 548 pages.

Intel, "Intel 64 and IA-32 Architectures Software Developer's Manual", vol. 2 (2A, 2B & 2C): Instruction Set Reference, A-Z, Order No. 325383-040US, Oct. 2011, 1721 pages.

Intel, "Intel 64 and IA-32 Architectures Software Developer's Manual", vol. 3 (3A, 3B & 3C): System Programming Guide, Order No. 325384-040US, Oct. 2011, 1916 pages.

Office Action received for Korean Patent Application No. 10-2015-0085170, dated Aug. 31, 2017, 6 pages of Korean Office Action including 3 pages of English Translation.

Notice on Grant of Patent Right for Invention from foreign counterpart Chinese Patent Application No. 201510350735.1, dated Mar. 29, 2019, 4 pages.

* cited by examiner

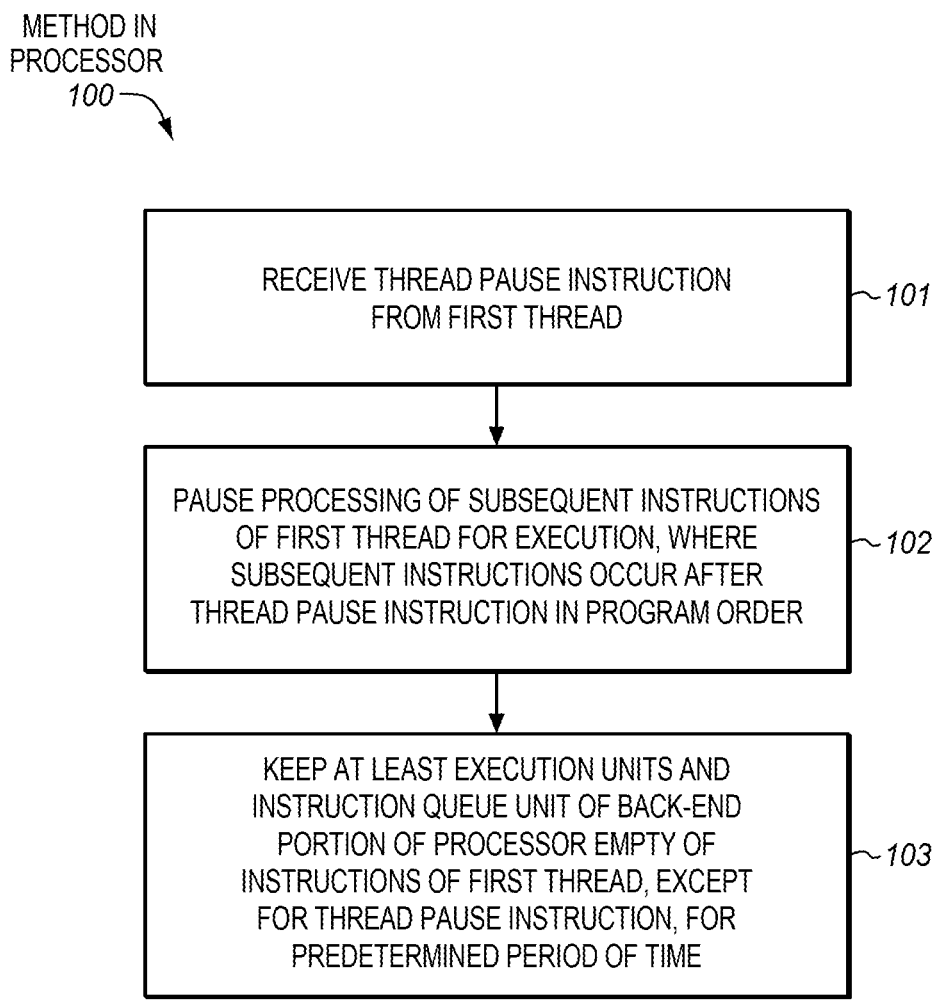

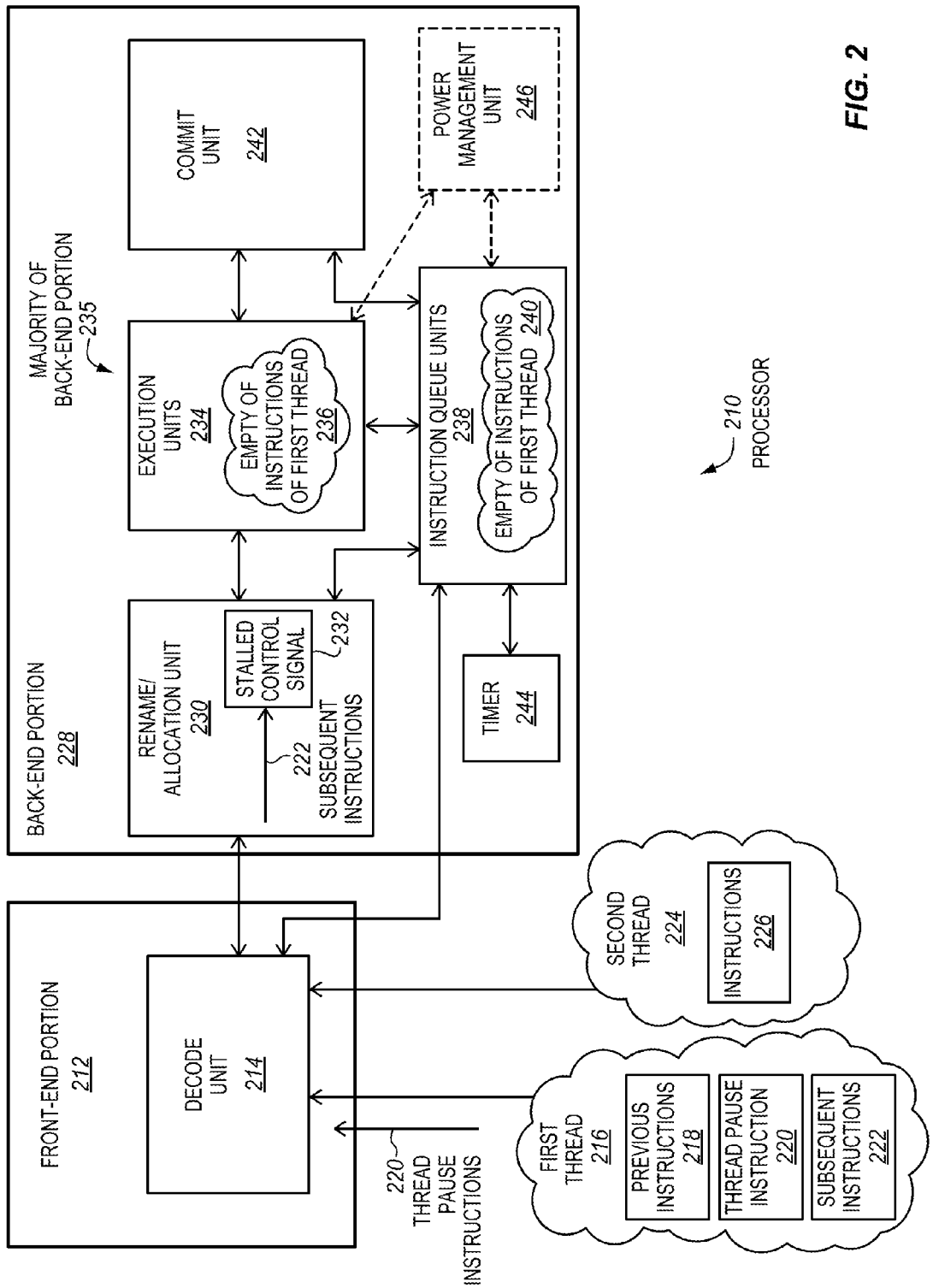

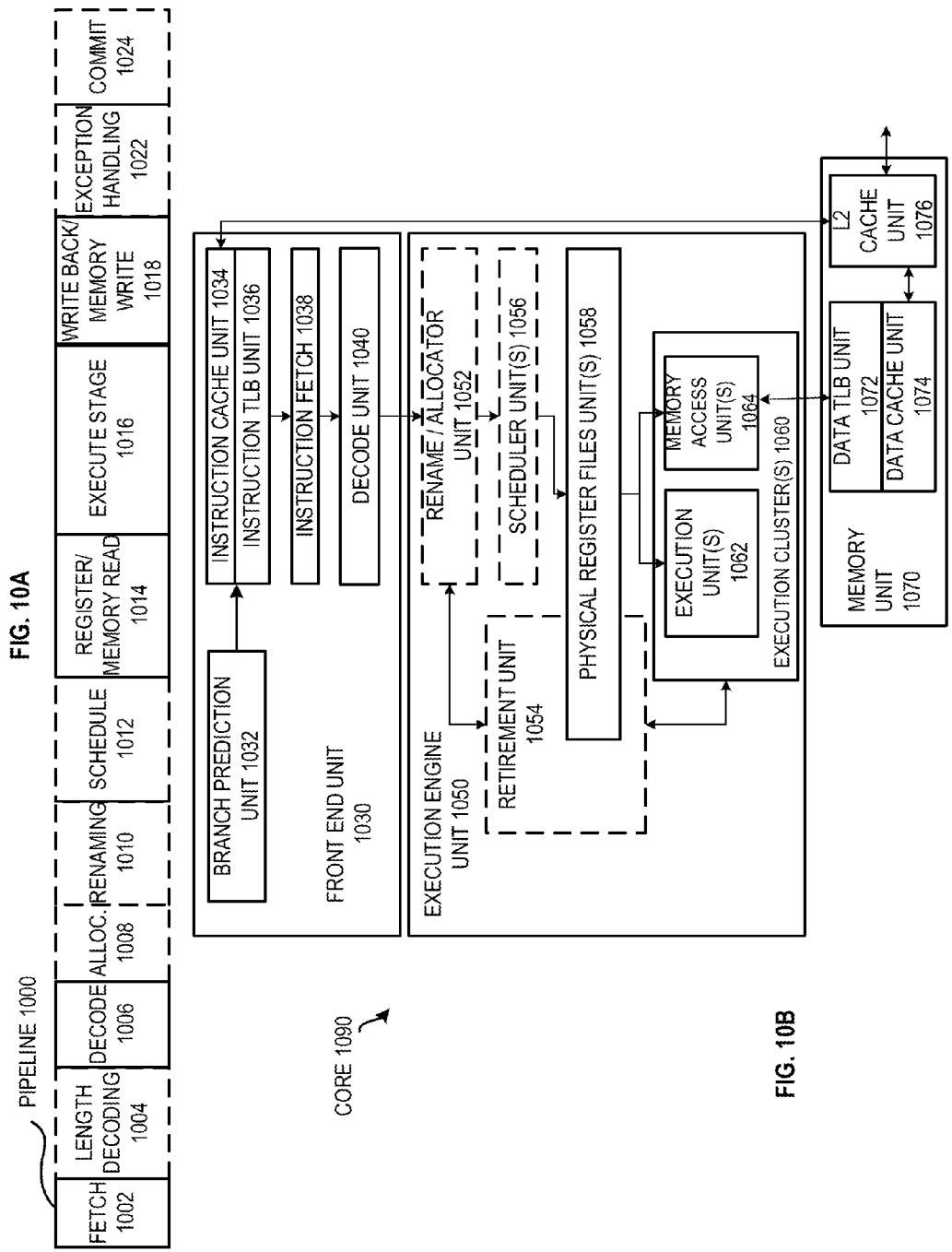

THREAD PAUSE PROCESSORS, METHODS, SYSTEMS, AND INSTRUCTIONS

BACKGROUND

Technical Field

Embodiments described herein generally relate to processors. In particular, embodiments described herein generally relate to pausing threads in processors.

Background Information

Software multithreading is a technique that has been used to help improve processor performance. In software multithreading, code (e.g., an application) may be partitioned into multiple threads. Each thread may represent an instruction stream or sequence that is capable of being performed separately from the others and/or in parallel. As one simple example, one thread may handle images of a video stream, while another thread may handle audio of the video stream.

Different approaches are available in terms of processor hardware to implement multithreading. One approach is known as interleaved or temporal multithreading. One example of such an approach is time-slice multithreading or time-multiplex (TMUX) multithreading, in which a single physical processor (e.g., a core) switches between threads on alternating cycles, or after a fixed period of time. Another example of such an approach is switch-on-event multithreading (SoEMT), in which a single physical processor switches between threads upon occurrence of a trigger event, for example, a long latency cache miss, a page fault, other long latency events, or the like. In interleaved or temporal multithreading, generally only one thread of instructions may execute in a given pipeline stage at a time.

Another multithreading approach is known as simultaneous multithreading (SMT). In SMT, instructions from more than one thread may be executing concurrently in a given pipeline stage of a single physical processor (e.g., a core) at a given time. For example, a single core may be made to appear as multiple logical processors to software, with each logical processor performing a different thread. Some resources of the core may be dedicated to a given thread or logical processor. For example, commonly each thread or logical processor may maintain a complete set of the architecture state. Other resources of the core may be shared by two or more threads or logical processors. For example, depending upon the particular implementation, caches, execution units, branch predictors, decoders, other logic, or a combination thereof, may be shared by two or more threads executing in a single physical core.

One challenge in multithreading is efficient handling of spin-wait loops. Threads often need to share resources and/or synchronize with other threads. A spin-wait loop is a technique used in multithreaded applications where one thread waits on another thread(s), for example, to synchronize or gain access to a shared resource. The spin-wait loop may represent a routine or section of code where a thread is accessing a synchronization primitive (e.g., a shared lock, semaphore, or mutex) in a tight polling loop. For example, the logical processor may execute a load-compare-branch loop to compare the synchronization primitive repeatedly until it has a desired value. The logical processor is generally able to execute the spin-wait loop very quickly, which may consume a significant amount of power and execution resources. However, executing the spin-wait loop rapidly generally does not improve performance.

A PAUSE or spin-loop hint instruction is described in Intel® 64 and IA-32 Architectures Software Developer's Manual, Order Number: 325462-049US, February 2014.

The PAUSE instruction is reported to improve the performance of spin-wait loops. It is also reported that an additional function of the PAUSE instruction is to reduce the amount of power consumed by a processor while executing a spin-wait loop.

U.S. Pat. No. 6,671,795 describes a method and apparatus for pausing execution in a processor. It is disclosed in part that a pause instruction may be used to pause execution of one thread in order to give preference to another thread or to save power.

BRIEF DESCRIPTION OF THE DRAWINGS

The invention may best be understood by referring to the following description and accompanying drawings that are used to illustrate embodiments. In the drawings:

FIG. 1 is a block flow diagram of an embodiment of a method of performing an embodiment of a thread pause instruction.

FIG. 2 is a block diagram of an embodiment of a processor to perform an embodiment of a thread pause instruction.

FIG. 10A is a block diagram illustrating an embodiment of an in-order pipeline and an embodiment of a register renaming out-of-order issue/execution pipeline.

FIG. 10B is a block diagram of an embodiment of processor core including a front end unit coupled to an execution engine unit and both coupled to a memory unit.

DETAILED DESCRIPTION OF EMBODIMENTS

Figure 3A:
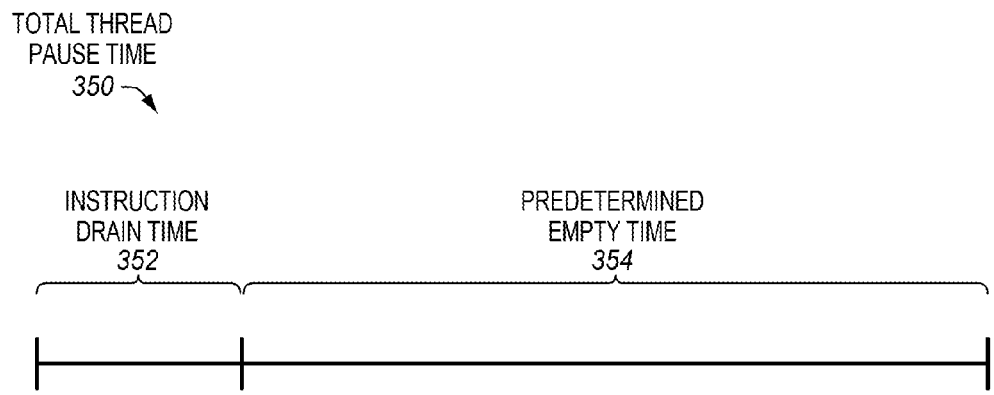
FIG. 3A illustrates an embodiment of a total thread pause time for a thread pause instruction.

Disclosed herein are thread pause instructions, processors to perform the instructions, methods performed by the processors when performing the instructions, and systems incorporating one or more processors to perform the instructions. In the following description, numerous specific details are set forth (e.g., specific instruction operations, processor configurations, microarchitectural details, sequences of operations, etc.). However, embodiments may be practiced without these specific details. In other instances, well-known circuits, structures and techniques have not been shown in detail to avoid obscuring the understanding of the description.

FIG. 1 is a block flow diagram of an embodiment of a method 100 of performing an embodiment of a thread pause instruction. In various embodiments, the method may be performed by a processor, instruction processing apparatus, or other digital logic device.

The method includes receiving the thread pause instruction from a first thread, at block 101. In various aspects, the instruction may be received at a processor, an instruction processing apparatus, or a portion thereof (e.g., an instruction fetch unit, a decode unit, a bus interface unit). In various aspects, the instruction may be received from an off-die source (e.g., memory, a bus or other interconnect), or from an on-die source (e.g., an instruction fetch unit, an instruction cache).

Processing of subsequent instructions of the first thread for execution is paused in response to the thread pause instruction (e.g., in response to an opcode of the instruction), at block 102. The subsequent instructions are those that occur after the thread pause instruction in program order.

At block 103, at least a portion of the back-end portion of the processor (e.g., at least execution units and an instruction queue unit) is kept empty of instructions of the first thread, except for the thread pause instruction, for a predetermined amount of time and/or a fixed duration, in response to the thread pause instruction.

The method has been shown and described in a relatively basic form, although operations may optionally be added to or removed from the method. By way of example, the instruction may be fetched, decoded, scheduled out-of-order, micro-architectural operations may be performed to implement the instruction, etc. In some embodiments, the micro-architectural operations to implement the instruction may optionally include any of those shown and described for any of FIGS. 2, 6, 7, and/or 8.

FIG. 2 is a block diagram of an embodiment of a processor 210 that is operable to perform an embodiment of a thread pause instruction 220. In some embodiments, the processor of FIG. 2 may perform the operations and/or method of FIG. 1. The components, features, and specific optional details described herein for the processor of FIG. 2, also optionally apply to the operations and/or method of FIG. 1, which may be performed by and/or within such a processor. Alternatively, the operations and/or method of FIG. 1 may be performed by and/or within a similar or different processor or other apparatus. Moreover, the processor of FIG. 2 may perform operations and/or methods the same as, similar to, or different than those of FIG. 1.

In some embodiments, the processor 210 may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may be any of various complex instruction set computing (CISC) processors, reduced instruction set computing (RISC) processors, very long instruction word (VLIW) processors, hybrids thereof, other types of processors, or have a combination of such different processors (e.g., in different cores).

During operation, the processor 210 may receive and process instructions of a first thread 216 and a second thread 224. The first thread includes a thread pause instruction 220, previous instructions 218 that occur before the thread pause instruction in program order, and subsequent instructions 222 that occur after the thread pause instruction in program order. The thread pause instruction may also be referred to herein simply as a pause instruction. The second thread also includes a set of instructions 226. The instructions of the first thread may be provided to the processor.

The processor includes a front-end portion 212 and a back-end potion 228. The front-end portion includes a decode unit or decoder 214. The decode unit may receive and decode instructions of the first and second threads, including the thread pause instruction 220. The thread pause instruction may represent a macroinstruction, assembly language instruction, machine code instruction, or other instruction or control signal of an instruction set of the processor. The decode unit may output one or more microinstructions, micro-operations, micro-code entry points, decoded instructions or control signals, or other relatively lower-level instructions or control signals that reflect, represent, and/or are derived from the thread pause instruction. The one or more lower-level instructions or control signals may implement the higher-level thread pause instruction through one or more lower-level (e.g., circuit-level or hardware-level) operations. The decode unit may be implemented using various different mechanisms including, but not limited to, microcode read only memories (ROMs), look-up tables, hardware implementations, programmable logic arrays (PLAs), and other mechanisms used to implement decode units known in the art.

In some embodiments, instead of the thread pause instruction being provided directly to the decode unit, an instruction emulator, translator, morpher, interpreter, or other instruction conversion module may optionally be used. Various types of instruction conversion modules are known in the arts and may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the thread pause instruction, which may be of a first instruction set, and may emulate, translate, morph, interpret, or otherwise convert the thread pause instruction into one or more corresponding or derived intermediate instructions or control signals, which may be of a second different instruction set. The one or more intermediate instructions or control signals of the second instruction set may be provided to a decode unit, which may decode them into one or more lower-level instructions or control signals executable by native hardware of the processor (e.g., pipeline components).

Referring again to FIG. 2, the processor also includes the back-end portion 228 coupled with the decode unit 214 and/or the front-end portion 212. The back-end portion may receive the one or more decoded or otherwise converted instructions or control signals that represent and/or are derived from the thread pause instruction. In the illustrated embodiment, the back-end portion includes a rename/allocation unit 230 coupled with an output of the decode unit, one or more execution units 234 coupled with an output of the rename/allocation unit, and a commit unit 242 coupled with an output of the execution unit(s). The back-end portion also includes one or more instruction queue units 238, such as, for example, units to hold a so-called pool or window of instructions in an out-of-order (OoO) portion of the processor. Examples of suitable instruction queue units include, but are not limited to, reorder buffers, reservation stations, and the like.

The illustrated embodiment pertains to an out-of-order (OoO) processor, although the scope of the invention is not so limited. In an OoO processor, the execution units may execute instructions OoO relative to the original program order of the instructions. For example, instead of executing the instructions in the program order, the processor may execute the instructions in an order that depends on the availability of input data and/or resource availability. Instructions that are able to execute may be executed without undue delay, instead of holding back their execution waiting on data and/or resources. The instructions may be stored or buffered in the instruction queue units 238 until they are ready to be executed by the execution units. After execution, the processor may need to re-order the OoO execution results and/or architectural state and present them (e.g., to software, a user, etc.) in the original program order instead of in the order in which the instructions were actually executed. To accomplish this, the instructions and their execution results may be stored or buffered in the instruction queue units 238 and logic of the processor may re-order the execution results and/or architectural state. The commit unit may control the update of the architectural state in the original program order. In one aspect, the commit logic may wait to commit each instruction until all older/prior instructions ahead of it in the original program order have already been committed.

In some embodiments, the back-end portion of the processor may be operable, in response to the thread pause instruction (e.g., in response to one or more control signals decoded from the thread pause instruction), to pause or delay processing of subsequent instructions of the first thread for execution. This may be implemented in different ways in different embodiments.

In some embodiments, a control signal decoded from the thread pause instruction may be stalled or retained at a particular pipeline stage (e.g., in the back-end portion of the processor) and thereby prevented from advancing further through the pipeline. Stalling the control signal in an in-order part of the processor may also block or prevent advancement through the pipeline of control signals decoded from all subsequent instructions (occurring after the thread pause instruction in program order) of the first thread. This may effectively pause or processing of the subsequent instructions of the first thread for execution. In other embodiments, rather than stalling a control signal, other approaches may be used to pause or delay processing of subsequent instructions of the first thread for execution. For example, a resource needed for the control signals to advance through the pipeline may be forced to appear full or unavailable. As one example, out-of-order instruction scheduling may be stopped and/or reservation stations may be forced to appear unavailable. Still other approaches will be apparent to those skilled in the art and having the benefit of the present disclosure.

Referring again to FIG. 2, in the illustrated example embodiment, a control signal is stalled 232 at a rename/allocation unit 230 in the back-end portion of the processor. The rename/allocation unit is generally included in an in-order stage at the start of the back-end of the processor and functionally disposed between the decode unit 214 and the execution units 234. The rename/allocation unit may perform register renaming and allocation of certain resources (e.g., register file entries, load buffers, store buffers, etc.). Alternatively, the control signal may be stalled or retained at other pipeline stages (e.g., in the back-end portion of the processor). It is worth noting that it is also possible to stall a control signal in the front-end portion 212 of the processor. For example, it is possible to stall a control signal generally at the decode unit 214. Eventually, if the control signal is stalled for long enough, the back-end portion 228 should drain of all previous control signals from the paused first thread. However, a possible drawback with such a stall in the front-end portion of the processor is that, especially if the pipeline is relatively deep, it may take a significant amount of time for the back-end portion to drain of these previous control signals from the paused first thread. This additional time to drain these instructions may tend to diminish the overall amount of time available for power reduction (e.g., clock gating idle portions of the processor). In other words, stalling the control signal in the back-end portion of the processor may provide relatively more time for power reduction.

While the first thread is paused, the commit unit 242 may continue to commit all previous instructions 218 of the first thread (i.e., those that occur before the thread pause instruction in original program order). Eventually, at least a portion, but often at least a majority 235 of the back-end portion of the processor may become empty of all of these previous instructions (e.g., the control signals decoded therefrom) of the first thread, except for the thread pause instruction which is still being performed in order to pause the first thread. In the illustrated example, the majority portion 235 includes, for example, all of the execution units 234 and at least some or all of the major instruction queue units 238 used to provide the instruction pool or window for out-of-order instruction execution. The particular units or resources will depend upon the particular implementation (e.g., what pipeline stage a stall is implemented at).

In some embodiments, in addition to pausing the processing of the subsequent instructions of the first thread for execution, the back-end portion of the processor may also be operable, in response to the thread pause instruction (e.g., in response to one or more control signals decoded from the thread pause instruction), to keep at least a portion, or often at least a majority 235 of the back-end portion of the processor, empty of instructions of the first thread, except for the thread pause instruction, for a predetermined, deterministic, or fixed period of time. The majority portion includes more than half of the back-end portion based on at least one of total number of transistors, total amount of integrated circuitry, or total on-die surface area. In the illustrated example, the majority portion 235 includes, for example, all of the execution units 234 and at least some or all of the major instruction queue units 238 used to provide the instruction pool or window for out-of-order instruction execution.

In some embodiments, the predetermined time when the portions of the back-end part of the processor are empty of control signals from the first thread may be implemented with a timer 244. Examples of suitable timers include, but are not limited to, forward timers, backward timers, forward counters, backward counters, increment logic, and decrement logic. In some embodiments, the back-end portion may be operable to initiate or activate the counter 244, in response to the thread pause instruction, after the majority portion 235 (e.g., including the execution units and more power consuming instruction queue units) has substantially completely emptied of control signals decoded from the previous instructions 218 of the first thread. In this way, the timer may be used to count a fixed, predetermined, or deterministic time that relatively more accurately reflects the actual time in which these portions are empty and/or would be idle if no other threads were being performed (e.g., in a single-threaded mode). Advantageously, this may ensure or guarantee a predetermined, fixed, or deterministic minimum time when these portions are empty of all previous instructions from the first thread.

It is worth noting that it is also possible to initiate the timer in the front-end portion of the pipeline. For example, the timer may be initiated responsive to decoding the thread pause instruction. However, one possible drawback with this approach is that initiating the timer responsive to decoding the thread pause instruction is performed when control signals decoded from the previous instructions 218 still exist in the back-end portion of the processor. For example, the execution units 234, instruction queue units 238, and the like, may still include these control signals. Even in a single-threaded mode, the execution unit and instruction queue unit would generally not be idle, but rather would still be active handling these control signals. Even after the first thread is paused, the execution units and instruction queue units would generally not be able to be idle until these control signals had time to drain from the back-end portion through being committed over time. The amount of time for this generally tends to be variable. As a result, the timer initiated or activated at decode of the thread pause instruction would generally represent a less accurate measure of the time when portions of the back end are actually empty of control signals from the first thread (e.g., and could be clock gated in a single-threaded mode).

In some situations, pausing the first thread 216 may be used to improve the performance of one or more other threads (e.g., the second thread 224). For example, in a simultaneous multithreading (SMT) mode, both the first thread 216 and the second thread 224 may be sharing certain resources of a core having the front-end portion 212 and the back-end portion 228. For example, the first and second threads may share the execution units 234, the instruction queue units 238, the commit unit 242, etc. The threads may contend for these resources and each thread may be performed somewhat more slowly because of the sharing of these resources. In some embodiments, when the first thread is paused, these resources may be freed for use by the second thread exclusively or nearly exclusively. This may help to improve the performance or speed of execution of the second thread. By way of example, it may be appropriate to pause the first thread when it is performing a spin-wait loop and generally would not be able to use these resources to perform useful work anyway. These resources may therefore better be utilized to improve overall performance by giving them to the second thread exclusively. Advantageously, in such situations, the pause instruction may help to improve overall performance through better/smarter resource utilization.

In other situations, pausing the first thread 216 may be used to reduce power consumption. For example, in a single-threaded mode, only the first thread 216 but no other threads may be running on a core having the front-end portion 212 and the back-end portion 228. The first thread may have exclusive use of the execution units 234, the instruction queue units 238, the commit unit 242, etc. In some embodiments, when the first thread is paused, at least a portion of the back-end portion of the processor may drain fully or empty of all control signals from the first thread (excepting those of the thread pause instruction itself), as described above. For example, the execution units 234 and the instruction queue units 238 may empty. When these resources become empty, they may also become idle inasmuch as they are not performing any processing or being used (e.g., the execution units are not being used and are idle). In some embodiments, the power consumption by these units may be reduced when they are empty or idle. For example, in some embodiments, a power management unit 246 coupled with the back-end portion may determine that these resources (e.g., the execution units 234, the instruction queue units 238) are idle, and may reduce power consumption of these resources by stopping or gating delivery of clock signals to these resources. This may help to reduce power consumption. By way of example, it may be appropriate to pause the first thread when it is performing a spin-wait loop, and generally would not be able to use these resources to perform useful work anyway. Rather than clocking these resources when they are not being used, power savings may be achieved by stopping or gating the clocks to these resources.

In still other situations, a combination of the two approaches mentioned above may be used. For example, in a simultaneous multithreading (SMT) mode, both the first thread 216 and the second thread 224 may be sharing certain resources of a core having the front-end portion 212 and the back-end portion 228. If only one of the threads (e.g., the first thread) is paused, then resources may be used relatively exclusively by the other non-paused thread (e.g., the second thread). Alternatively, during times when all threads are concurrently paused (e.g., both of the threads are concurrently performing a spin-wait loop with overlapping pause periods), resources (e.g., the execution units 234, the instruction queue units 238) may empty of all control signals from all threads, and may become idle. In such situations, the power management unit 246 may detect the idleness and take power reduction actions (e.g., stop or gate clock delivery to these idle resources).

As described above, in some embodiments, the thread pause instruction may force or at least cause conditions that allow power reduction (e.g., turning off clocks). In some embodiments, the thread pause instruction itself may not directly stop any power delivery or cause any clocks to be gated or stopped. Rather, the power management unit 246, which may optionally be a conventional power management unit not controlled directly by the thread pause instruction, may use existing and/or conventional power reduction mechanisms (e.g., clock gating based on idleness) to reduce power. The pause instruction may force or at least cause at least a portion, often at least the majority 235, of the back-end portion to empty of all instructions from the paused thread(s). At times when such portions are completely empty of all instructions and idle, the power management unit 246 may be operable to detect that these parts are inactive and/or idle and stop their clock drivers. In some embodiments, the thread pause instruction may be designed or intended to intelligently leverage or work with the existing power management mechanism to cause pausing of processing of instructions of a thread and also draining or emptying of a portion of the processor to create idleness detectable by the power management mechanism leading to clock gating. In this way, the thread pause instructions may be regarded as power reduction supportive thread pause instructions in that the way they operate supports or aids power reduction when no other non-paused threads are active.

The processor may include specific or particular logic (e.g., transistors, integrated circuitry, or other hardware potentially combined with firmware (e.g., instructions stored in non-volatile memory) and/or software) that is operable to perform the thread pause instruction and/or pause execution of the thread in response to and/or as a result of the thread pause instruction. In some embodiments, the processor may include the units, circuitry, or logic shown and described for any one or more of FIGS. 6-7, although the scope of the invention is not so limited.

To avoid obscuring the description, a relatively simple processor 210 has been shown and described. In other embodiments, the processor may optionally include other well-known processor components. Numerous different combinations and configurations of such components are suitable. Embodiments are not limited to any known combination or configuration. Moreover, embodiments may be included in processors have multiple cores, logical processors, or execution engines at least one of which has logic to perform an embodiment of a thread pause instruction.

FIG. 3A illustrates an example embodiment of a total thread pause time 350 for a thread pause instruction. The total thread pause time includes an instruction drain time 352 and a predetermined empty time 354. The instruction drain time represents the time, after processing of instructions of the paused thread for execution is commenced, for the control signals of the previous instructions occurring before the thread pause instruction in program order to drain from the processor pipeline (e.g., by being committed). The predetermined empty time 354 period represents the fixed, predetermined, or deterministic time starting when the processor pipeline is empty of these control signals from the previous instructions.

Figure 3B:
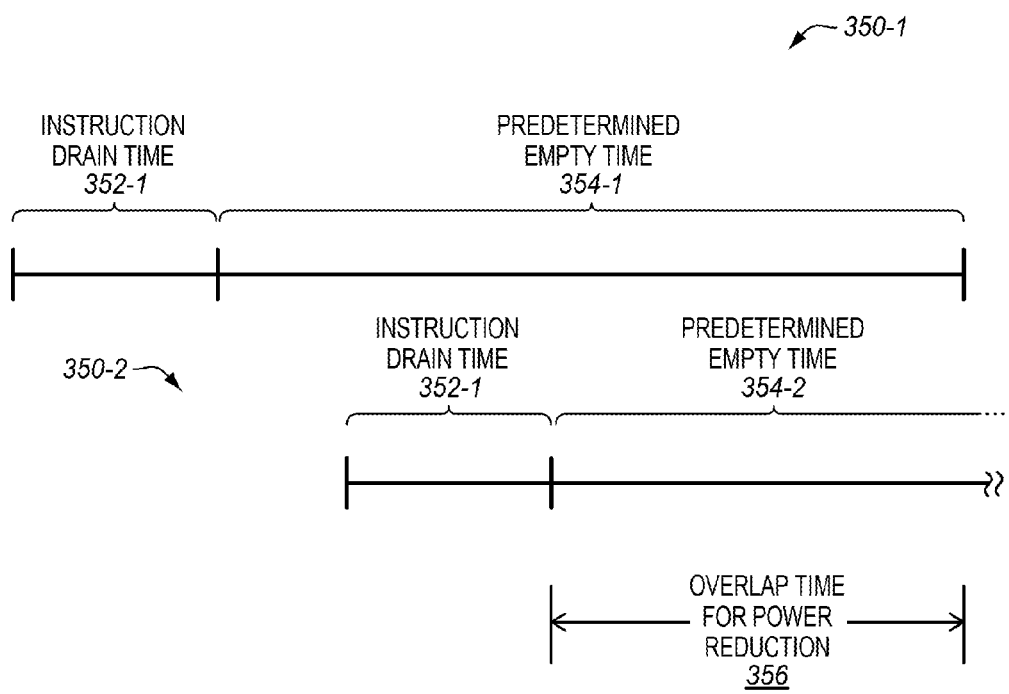
FIG. 3B illustrates an embodiment of a first total thread pause time for a first thread pause instruction of a first thread overlapping a second total thread pause time for a second thread pause instruction of a second thread.

FIG. 3B illustrates an example embodiment of a first total thread pause time 350-1 for a first thread pause instruction of a first thread overlapping a second total thread pause time 350-2 for a second thread pause instruction of a second thread. The first total thread pause time includes an instruction drain time 352-1 and a predetermined empty time 354-1. Similarly, the second total thread pause time includes an instruction drain time 352-2 and a predetermined empty time 354-2. An overlap time for power reduction 356 shows portions of the predetermined empty times 354-1, 354-2, which overlap one another in actual time. This represents the amount of time available for power reduction, such as, for example, by stopping or gating clock signals to resources used by the first and second threads.

Figure 4:
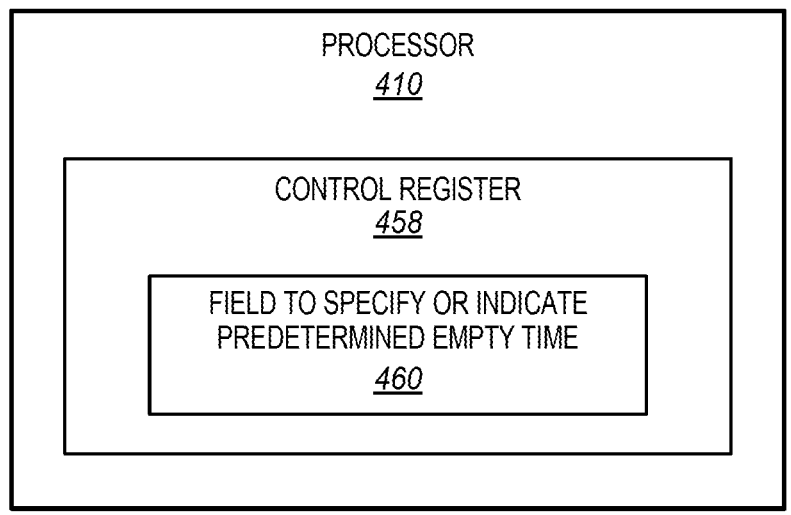
FIG. 4 is a block diagram of an embodiment of a processor having a control register having a field to specify or otherwise indicate a predetermined empty time.
Figure 5:
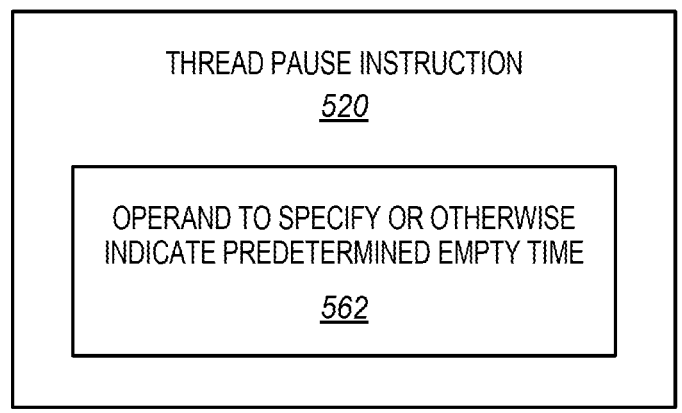
FIG. 5 is a block diagram of an embodiment of a thread pause instruction having an operand to specify or otherwise indicate a predetermined empty time.

Different ways of providing a predetermined empty time (e.g., predetermined empty time 354) for a thread pause instruction are possible. FIGS. 4-5 illustrate examples of suitable approaches.

FIG. 4 is a block diagram of an embodiment of a processor 410 having a control register 458 having a field 460 to specify or otherwise indicate a predetermined empty time (e.g., predetermined empty time 354). In some embodiments, the predetermined empty time may be configured in the control register by a processor manufacturer at a time of manufacture of the processor and may not be re-configurable during use and/or by an end user. In other embodiments, the predetermined empty time may be configurable during use and/or by an end user. For example, a privileged-level instruction (e.g., accessible only to an operating system, hypervisor, or other privileged software) or a user-level instruction accessible to user-level applications may be included to configure or re-configure the predetermined empty time.

FIG. 5 is a block diagram of an embodiment of a thread pause instruction 520 having an operand 562 to explicitly specify or otherwise indicate a predetermined empty time (e.g., predetermined empty time 354). The operand may represent one or more bits or fields of the instruction. In some embodiments, the one or more bits or fields indicate a register or other storage location having a value that specifies or indicates the predetermined empty time. In other embodiments the one or more bits or fields themselves provide a value that specifies or indicates the predetermined empty time. For example, an immediate of the thread pause instruction may specify or otherwise indicate the predetermined empty time. Whether the value is provided in the instruction directly or indirectly through a register or other storage location, the value may either explicitly specify the predetermined empty time (e.g., explicitly specify a number of clock cycles to be used for the predetermined empty time), or otherwise indicate the predetermined empty time (e.g., provide a value that selects between a number of different predetermined empty times). For example, the thread pause instruction may have two bits to select between or indicate any one of four different predetermined empty times. As one specific example, a 2-bit field may have a value 00 to select a predetermined empty time of 0-cycles, a value 01 to select a predetermined empty time of 32-cycles, a value 10 to select a predetermined empty time of 64-cycles, and a value 11 to select a predetermined empty time of 128-cycles.

It is to be appreciated that the aforementioned times are just examples, and that the scope of the invention is not limited to any known value of the predetermined empty time, although generally the time should not be either too long or too short. If the time is too long, a paused thread may miss an opportunity to grab a released synchronization primitive. If the time is too short, power reduction possibilities may be diminished. In addition, the optimal amount of time for the predetermined empty time may depend on the number of processors using shared synchronization primitives. For example, if a high number of processors are waiting on a shared synchronization primitive, using predetermined empty times that are too long may tend to reduce overall system performance by causing paused threads to miss opportunities to acquire locks. Those skilled in the art will appreciate that suitable amounts of time may be estimated or determined by various approaches, such as, for example, simulation, tuning post-silicon, and the like. In some embodiments, any value in the range of about 0 to about 256 clock cycles, or from about 32 to about 128 clock cycles, may optionally be used, although the scope of the invention is not so limited.

Figure 6:
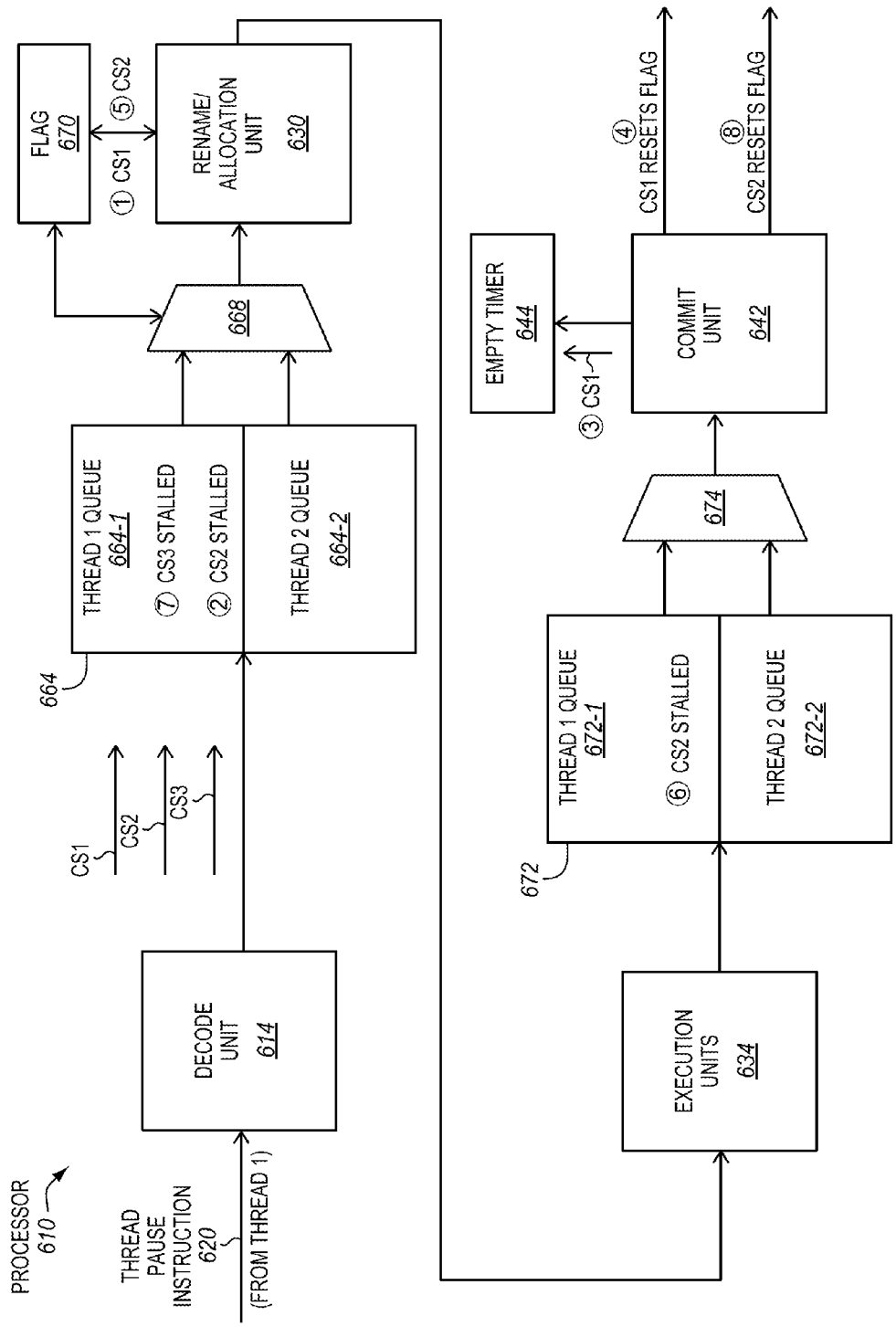
FIG. 6 is a block diagram of a particular example embodiment of a processor operable to perform an example embodiment of a thread pause instruction.

FIG. 6 is a block diagram of a detailed example embodiment of a processor 610 operable to perform an example embodiment of a thread pause instruction 620. The processor includes a decode unit 614 and a pre-rename/allocation queue 664. The queue 664 is partitioned into a thread 1 queue 664-1 that corresponds to, and is used to store control signals from, a first thread (i.e., thread 1), and a thread 2 queue 664-2 that corresponds to, and is used to store control signals from, a second thread (i.e., thread 2). A multiplexer or other selection unit 668 is used to select control signals from either thread 1 or thread 2 from the queue 664 and provide them to a rename/allocation unit 630 of the processor. The processor also includes one or more execution units 634 and a pre-commit queue 672. The pre-commit queue is similarly partitioned into a thread 1 queue 672-1 that corresponds to, and is used to store control signals from, thread 1, and a thread 2 queue 672-2 that corresponds to, and is used to store control signals from, thread 2. A second multiplexer or other selection unit 674 is used to select control signals from either thread 1 or thread 2 from the queue 672 and provide them to a commit unit 642 of the processor.

It is to be appreciated that the decode unit 614, the rename/allocation unit 630, the execution unit(s) 634, and the commit unit 642 may optionally be similar to, or the same as, the correspondingly named units described elsewhere herein (e.g., in conjunction with FIG. 2), and may have similar variations and alternatives. To avoid obscuring the description, the discussion below will tend to emphasize the new or additional aspects of the illustrated embodiment, rather than repeating all of the aspects that may optionally be the same or similar. In addition, the illustrated processor is dual-threaded, although in other embodiments the processor may optionally have three or more hardware threads.

The thread pause instruction 620 of the first thread (i.e., thread 1) may be provided to the decode unit 614. The decode unit may decode the thread pause instruction into a number of control signals. In the particular illustrated example embodiment, the control signals include a first control signal (CS1), a second control signal (CS2), and a third control signal (CS3). In some embodiments, each of these control signals may represent a micro-operation or micro-op. In other architectures, other types of control signals may be used instead.

CS1 may be provided to thread 1 queue 664-1 of the pre-rename/allocation queue 664. The selection unit 668 may select CS1 for allocation and may provide it to the rename/allocation unit 630. In some embodiments, as shown at reference numeral (1), when CS1 goes through allocation, it may set a flag 670 (e.g., a scoreboard, one or more bits, etc.). In some embodiments, the set flag may prevent further allocation of control signals from the corresponding thread (i.e., thread 1). The second control signal (CS2) may be provided to thread 1 queue 664-1 of the pre-rename/allocation queue 664. In some embodiments, as shown at reference numeral (2), CS2 may be stalled in the thread 1 queue 664-1 of the pre-rename/allocation queue 664 due to the set flag 670 that was set by the first control signal (CS1) upon allocation. Stalling or holding back CS2 may effectively block allocation of control signals from thread 1 such that no other control signals younger than the thread pause instructions proceed through the pipeline toward execution. In this case the stall is at allocation, although the scope of the invention is not so limited.

CS1 may then proceed to flow through the pipeline through the execution unit(s) 634, the queue 672 and be committed by the commit unit 642. In some embodiments, as shown at reference numeral (3), when CS1 is committed, the control signal CS1 may activate or start an empty timer 644. In some embodiments, the empty timer may be a hardware timer (e.g., an incrementing or decrementing counter) that is deployed generally at the commit stage of the pipeline. In some embodiments, the processor may include such an empty timer per-hardware thread. In some embodiments, the empty timer may stall or prevent retirement of subsequent control signals from the corresponding thread (i.e., in this case thread 1) for a predetermined empty time. As shown at reference numeral (4), when CS1 is committed, it may reset the flag 670.

In some embodiments, the stages of the pipeline between the output of the pre-rename/allocate queue 664 and the commit unit 642 may be empty of control signals from thread 1 at the time when CS1 is committed. For example, CS1 and CS2 may be back-to-back control signals. The commit unit may commit instructions in-order such that all previous instructions from thread 1 may be committed prior to CS1 being committed. In addition, since CS1 and CS2 are back-to-back control signals, no other control signals are in the pipeline between them. CS2 is held back from allocation due to the flag 670. Accordingly, the aforementioned pipeline stages are effectively drained or empty of control signals from thread 1 excepting CS1 and CS2.

In some embodiments, when CS1 is committed, and resets the flag as shown at reference numeral (4), CS2 may be allocated. In some embodiments, as shown at reference numeral (5), when CS2 is allocated it may again set the flag 670 so that allocation of subsequent control signals from thread 1 is blocked. CS2 may then proceed through the pipeline. As shown at reference numeral (6), CS2 may be stalled or held back in the thread 1 queue 672-1 of the pre-commit queue 672 while the empty timer 644 counts or times the predetermined empty time. When the empty timer has counted or timed the predetermined empty time, then the selector unit 674 may select CS2 and provide it to the commit unit 642.

In some embodiments, as shown at reference numeral (7), CS3 may be stalled or held back in the thread 1 queue 664-1 of the pre-rename/allocation queue 664 due to set flag 670 that was set at reference numeral (5) during the allocation of CS2. In some embodiments, as shown at reference numeral (8), when CS2 is committed, it may rest the flag 670. This may allow CS3, as well as control signals for subsequent instructions from thread 1, to be allocated and flow freely through the pipeline. Accordingly, the time period of pausing thread 1 may end responsive to the thread pause instruction (e.g., responsive to retirement of a control signal (e.g., CS2) decoded from the thread pause instruction.

Figure 7:
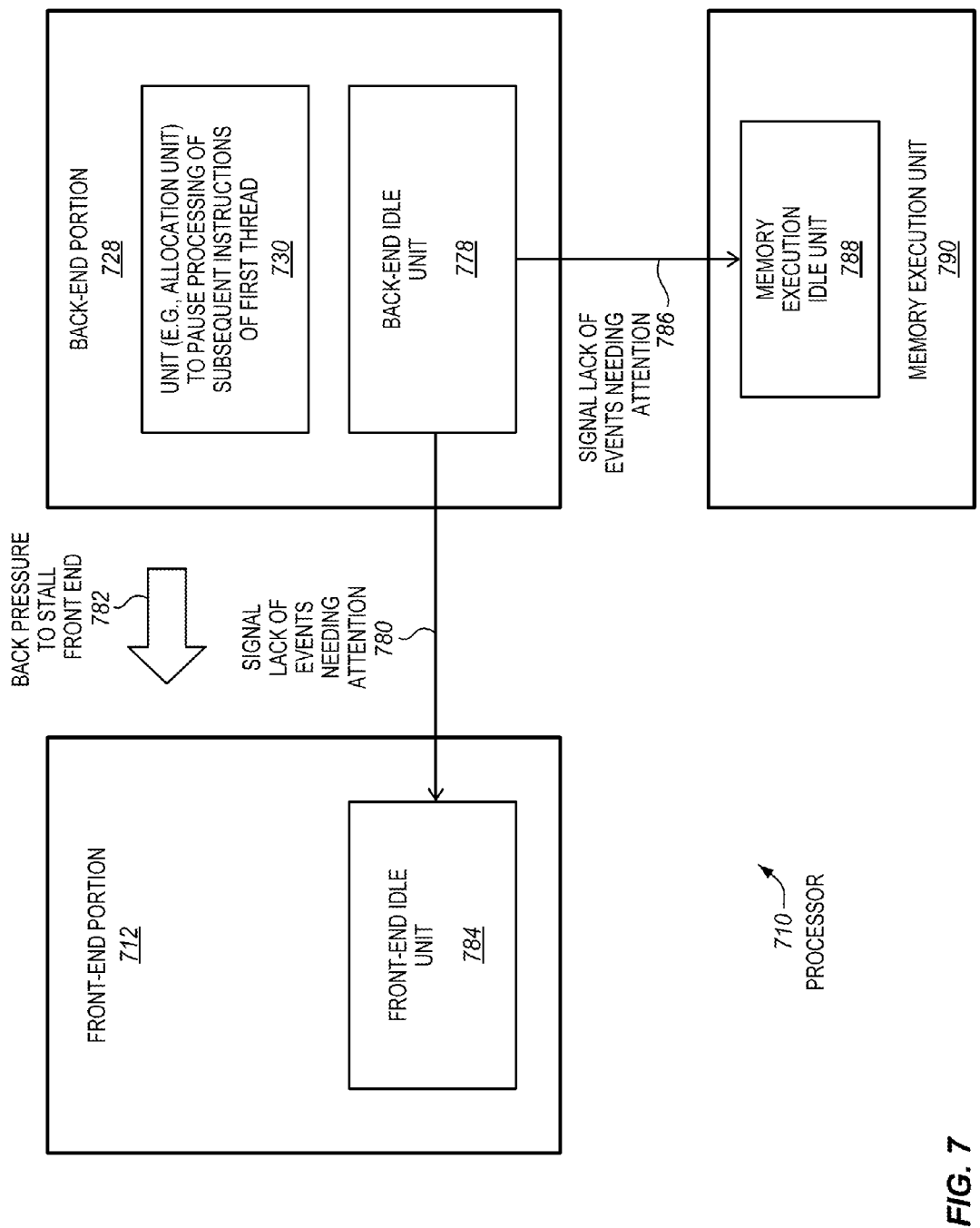
FIG. 7 is a block diagram of an embodiment of a processor having a back-end portion that is operable, responsive to a thread pause instruction, to signal a front-end portion and/or a memory execution unit when the back-end portion is idle.

FIG. 7 is a block diagram of an embodiment of a processor 710 that includes a back-end portion 728 that is operable, responsive to a thread pause instruction, to optionally signal a front-end portion 712 and/or a memory execution unit 790 when the back-end portion is idle. The back-end portion includes a unit or logic 730 (e.g., a rename/allocation unit) that is operable, responsive to the thread pause instruction, to pause processing of subsequent instructions of a thread. This may be performed substantially as described elsewhere herein. As previously mentioned, at least a portion, often at least a majority, of the back-end of the processor may become empty of instructions from that paused thread. When no other threads are actively being processed by the back end of the processor (e.g., in a single-threaded mode or when all other threads are also paused, stalled, or stopped), these portions may also become idle or inactive. This also may occur as described elsewhere herein.

The pausing or stalling of the thread in the back-end portion may also tend to cause or promote a consequential pausing or stalling of the flow of instructions and/or control signals of the paused thread in the front-end portion of the processor. This stalling or pausing of the front-end unit may be due to a sort of backpressure 782 due to inability of control signals to get past the stall in the back-end portion 728. Although the front-end portion of the processor generally will not be empty, it may become idle or inactive due to the backpressure. The memory execution unit 790 may also become idle or inactive when the back-end portion is idle or inactive.

Now, the front-end portion 712 is not necessarily automatically able to stop its clocks even when it is idle or inactive. For example, the front-end portion may need to keep its clocks going if it expects or is likely to expect certain signals or events from the back-end portion 728 that need to be processed. By way of example, such events may include, but are not limited to, jump misprediction clears that may occur when a jump that executes is resolved as mispredicted, exception clears that may occur when an instruction commits, or other clearing events, for example.

In some embodiments, around the time when the back-end portion becomes idle (e.g., right before it becomes idle, after it becomes idle, etc.) the back-end portion may signal 780 the front-end portion 712. For example, a back-end idle unit 778 or other logic may signal a front-end idle logic 784 or other logic. The signal may make various different indications in different embodiments. By way of example, the signal may indicate that the back-end portion will be idle, may indicate that the back-end portion won't provide events that need the attention of the front-end portion, a reassurance that the back-end portion thinks the front-end portion may stop its clocks, or the like. The signal may help the front-end portion to know that it may safely stop its clocks. Without such a signal, it may not be possible for the front-end portion to stop its clocks and/or it may not be as easy for the front-end portion to stop its clocks and/or the front end portion may not be able to stop its clocks for as long a period of time, depending upon the particular implementation. In some embodiments, the signal may optionally indicate a number of clock signals that the back-end portion will stop its clocks for and/or will not need the front-end portion for.

In some embodiments, around the time when the back-end portion becomes idle (e.g., right before it becomes idle, after it becomes idle, etc.) the back-end portion may signal 786 the memory execution unit 790. For example, the back-end idle unit 778 or other logic may signal a memory execution unit idle logic 788 or other logic. The signal may make various different indications analogous to those described above for the front-end portion, in various different embodiments. By way of example, the signal may indicate that the back-end portion will be idle, may indicate that the back-end portion won't provide events that need the attention of the memory execution unit, a reassurance that the back-end portion thinks the memory execution unit may stop its clocks, or the like. The signal may help the memory execution unit to know that it may safely stop its clocks. Without such a signal, it may not be possible for the memory execution unit to stop its clocks and/or it may not be as easy for the memory execution unit to stop its clocks and/or the memory execution unit may not be able to stop its clocks for as long a period of time, depending upon the particular implementation. In some embodiments, the signal may optionally indicate a number of clock signals that the back-end portion will stop its clocks for and/or will not need the memory execution unit for.

Figure 8:
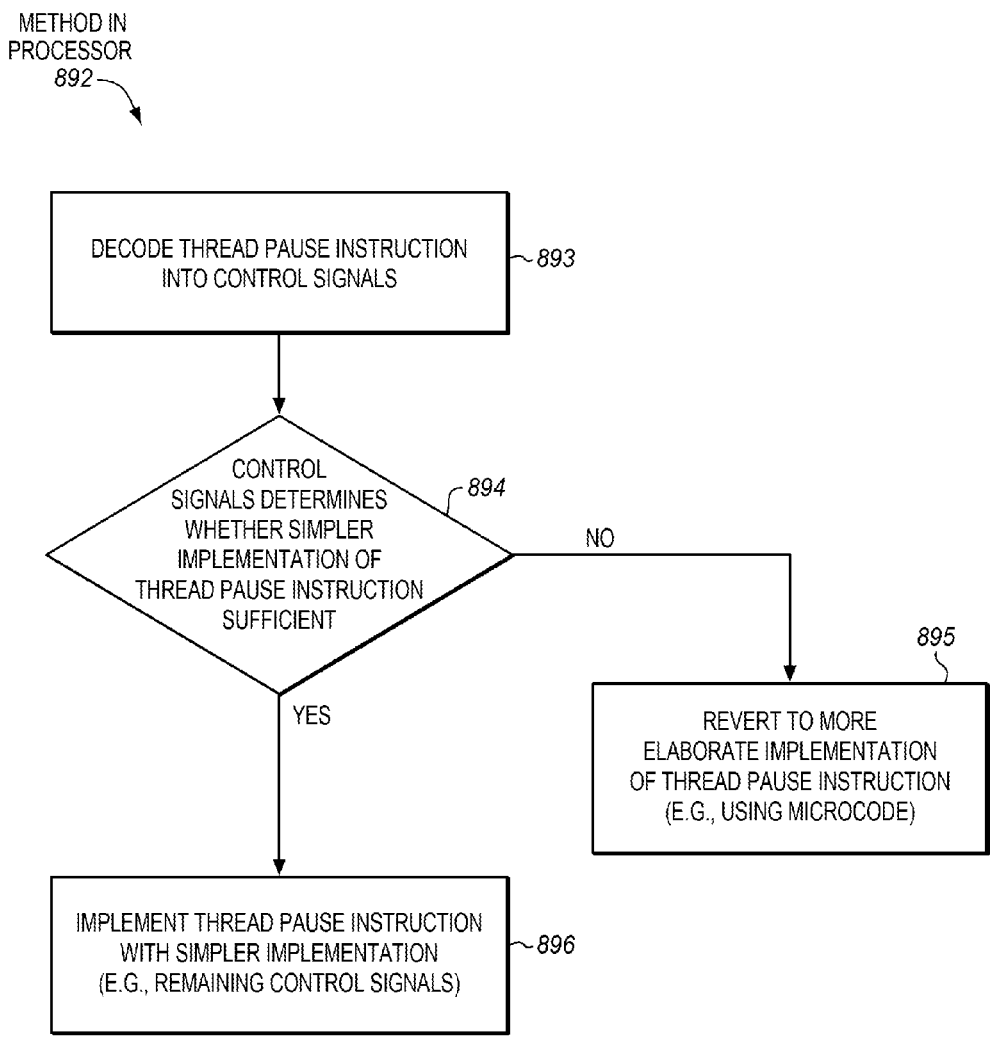
FIG. 8 is a block flow diagram of an embodiment of a method of performing a thread pause instruction including determining whether to use a simpler implementation or a more elaborate implementation.

FIG. 8 is a block flow diagram of an embodiment of a method 892 of performing a thread pause instruction. The method may be performed in a processor, instruction processing apparatus, or other digital logic device. The method includes decoding the thread pause instruction into a set of control signals, at block 893. The instruction may be decoded as described elsewhere herein.

At block 894, one or more control signals of the set of control signals may make a determination whether a relatively simpler implementation of the thread pause instruction is sufficient, or whether a relatively more elaborate implementation of the thread pause instruction (e.g., using microcode) should be performed. The way in which the determination is made at block 894 generally depends upon the particular implementation and architectural features of the processor/apparatus in which the method is performed. By way of example, certain architectural features, enhancements, or extensions, such as, for example, support for virtualization (e.g., Intel® Virtualization Technology), support for transactional execution (e.g., Restricted Transactional Memory), or other architectural features, may impose additional processing on the implementation of the thread pause instruction. For example, it is described in Intel® 64 and IA-32 Architectures Software Developer's Manual, Order Number: 325462-049US, February 2014, that performance of a pause instruction may cause transactional execution to be aborted. It is also described in this reference that pause instructions may or may not cause virtual machine exits. Accordingly, in some embodiments, the determination at block 894 may involve determining whether or not virtualization is being used and/or determining whether or not transactional execution is being used. For example, this may include inspecting one or more bits in one or more control registers to see if these features are being used. In other embodiments, other architectural features or extensions may impact the implementation of the thread pause instruction and therefore be relevant.

If the determination at block 894 is that the simpler implementation is sufficient (i.e., "yes" is the determination), for example, if architectural feature(s) that would complicate the implementation of the thread pause instruction are not being used (e.g., neither virtualization nor transactional execution is being used), then the method may advance to block 896. At block 896, the thread pause instruction may be implemented with the relatively simpler implementation. For example, in some embodiments, one or more remaining control signals of the set of control signals decoded at block 893 may be used to implement the thread pause instruction.

Conversely, if the determination at block 894 is that the simpler implementation is not sufficient (i.e., "no" is the determination), for example, if architectural feature(s) that would complicate the implementation of the thread pause instruction are being used (e.g., virtualization is being used and/or transactional execution is being used), then the method may advance to block 895. At block 895, the method may revert to implementing the thread pause instruction with the relatively more elaborate implementation. For example, in some embodiments, the method may revert to implementing the thread pause instruction using a microcode implementation. By way of example, the more elaborate implementation may include additional operations to make sure that the pause instruction is implemented correctly in view of one or more architectural features that complicate its implementation. In one aspect, these additional operations may potentially be difficult or in some cases infeasible to implement in decoded control signals (e.g., micro-operations) decoded by the decoder. For example, the decoder may not be able to decode enough control signals to implement all need checks and other operations. In some embodiments, the more elaborate implementation may take more time and/or perform more operations, or otherwise tend to diminish the power saving opportunities of the thread pause instruction.

Advantageously, the method may allow a relatively simpler implementation of the thread pause instruction to be used when appropriate (e.g., when complicating architectural features are not being used). This may help to reduce the amount of time and resources needed to perform the pause instruction, which may either allow reducing power sooner or freeing up resources for another thread sooner. When the simpler implementation is not appropriate the method may revert to a more elaborate implementation (e.g., that handles complicated architectural features more rigorously). Such a more elaborate implementation may be used selectively when needed instead of at times when it is not needed and more power may be saved through the simpler implementation.

Exemplary Register Architecture

Figure 9:
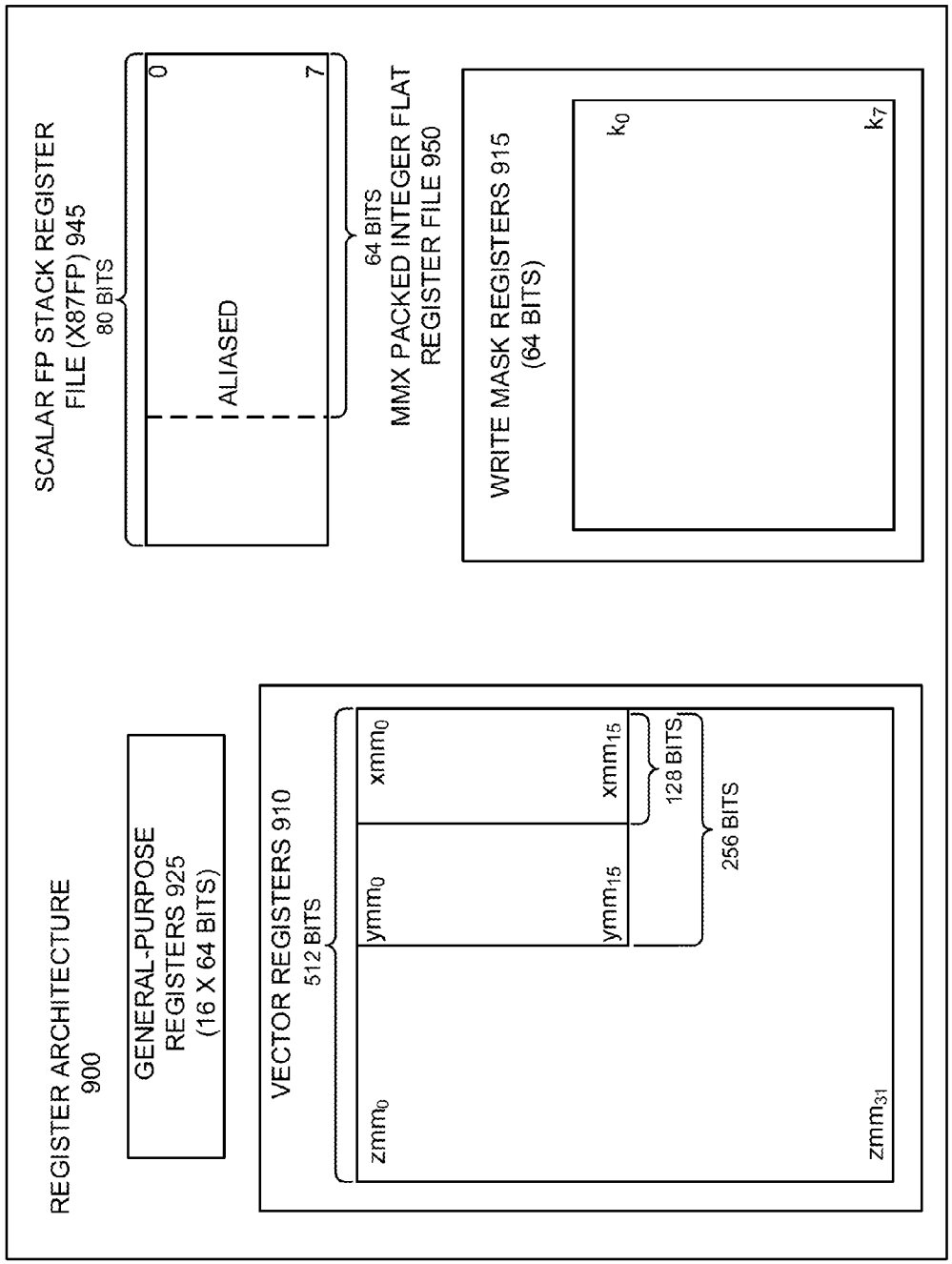
FIG. 9 is a block diagram of an embodiment of a suitable register architecture according to one embodiment of the invention.

FIG. 9 is a block diagram of a register architecture 900 according to one embodiment of the invention. In the embodiment illustrated, there are 32 vector registers 910 that are 512-bits wide; these registers are referenced as zmm0 through zmm31. The lower order 256 bits of the lower 12 zmm registers are overlaid on registers ymm0-12. The lower order 128-bits of the lower 12 zmm registers (the lower order 128-bits of the ymm registers) are overlaid on registers xmm0-11.

Write mask registers 911—in the embodiment illustrated, there are 8 write mask registers (k0 through k7), each 64 bits in size. In an alternate embodiment, the write mask registers 911 are 12 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R11.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and Out-of-order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB)

1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11B:
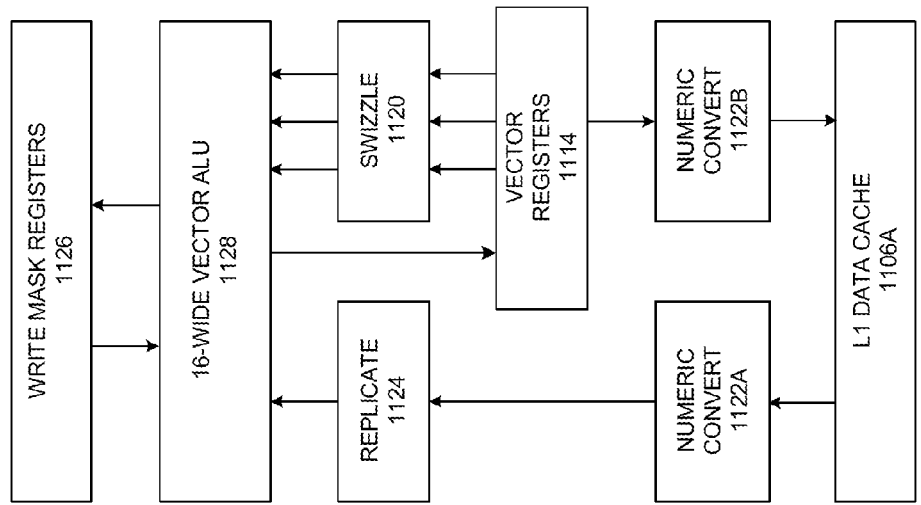
FIG. 11B is a block diagram of an embodiment of an expanded view of part of the processor core of FIG. 11A.
Figure 11A:
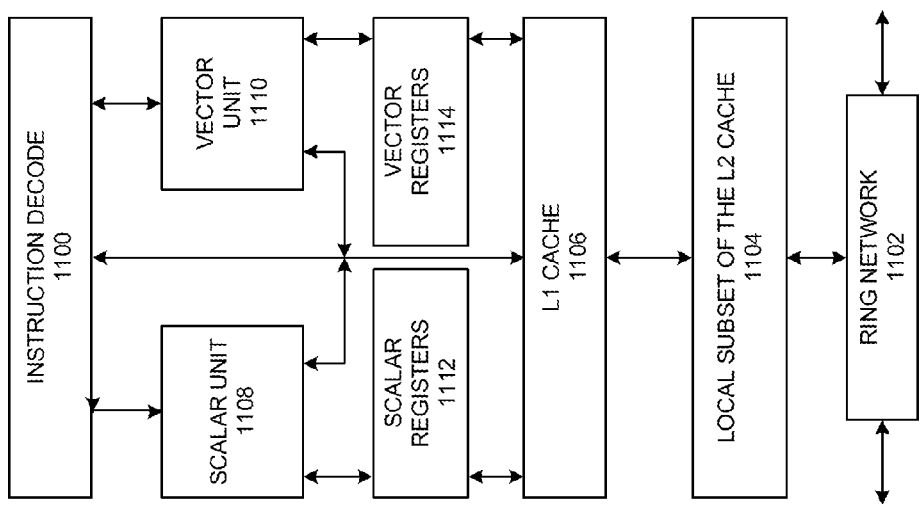
FIG. 11A is a block diagram of an embodiment of a single processor core, along with its connection to the on-die interconnect network, and with its local subset of the Level 2 (L2) cache.

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
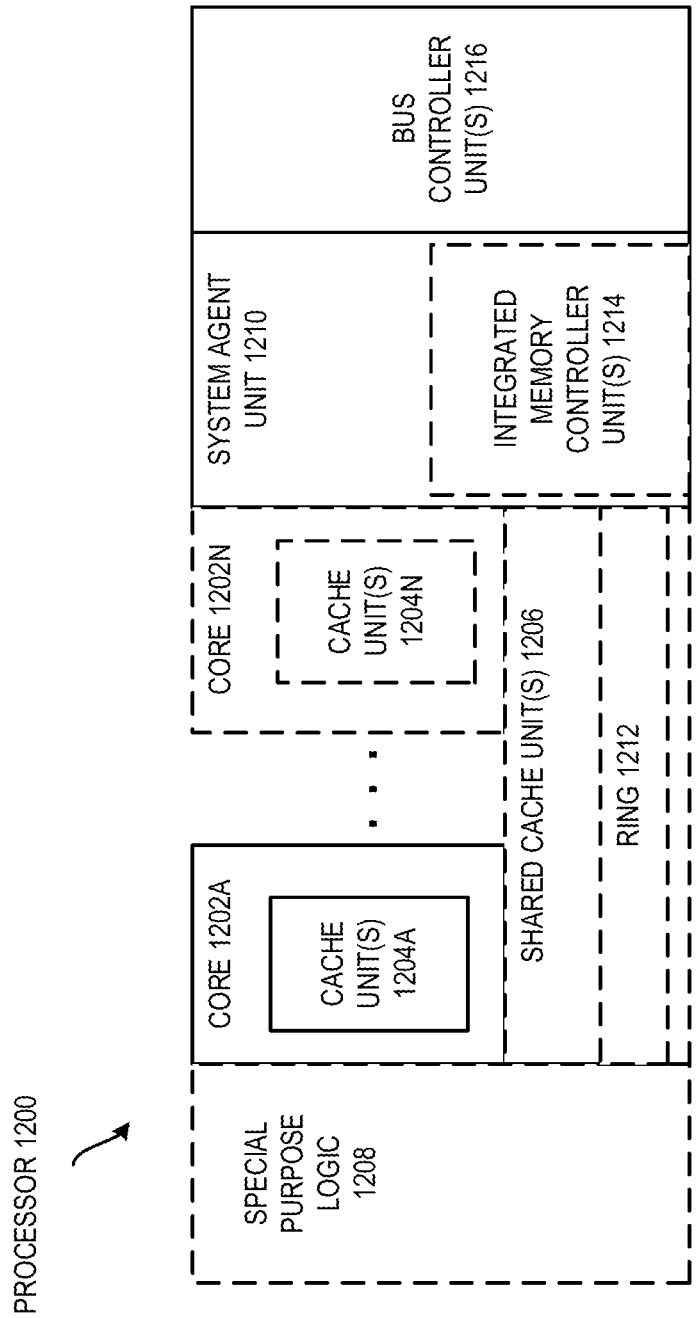
FIG. 12 is a block diagram of an embodiment of a processor that may have more than one core, may have an integrated memory controller, and may have integrated graphics.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
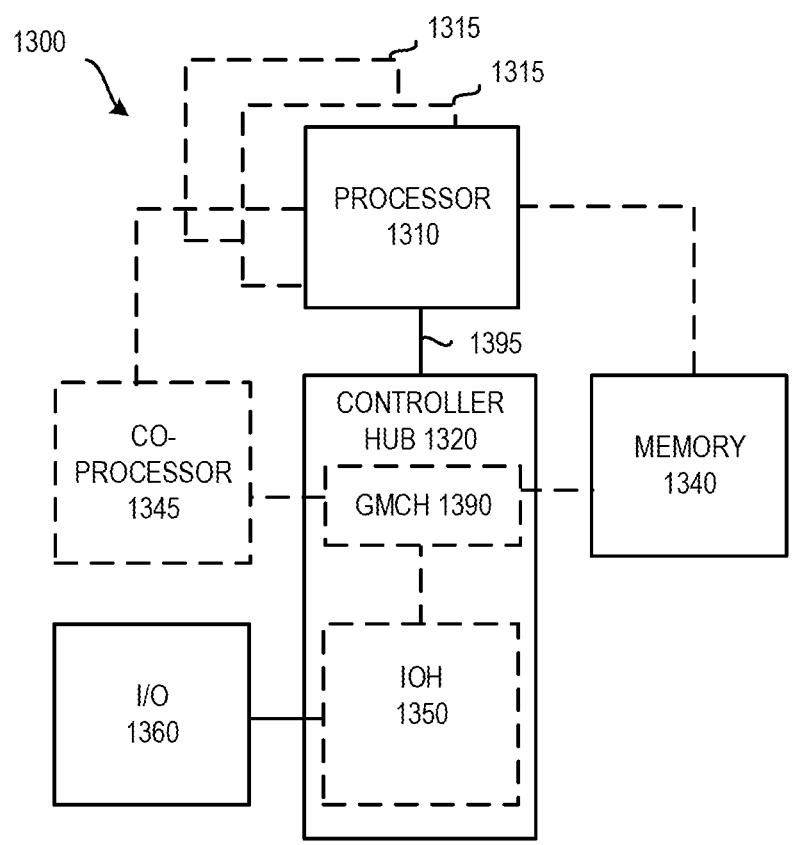
FIG. 13 is a block diagram of a first embodiment of a computer architecture.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
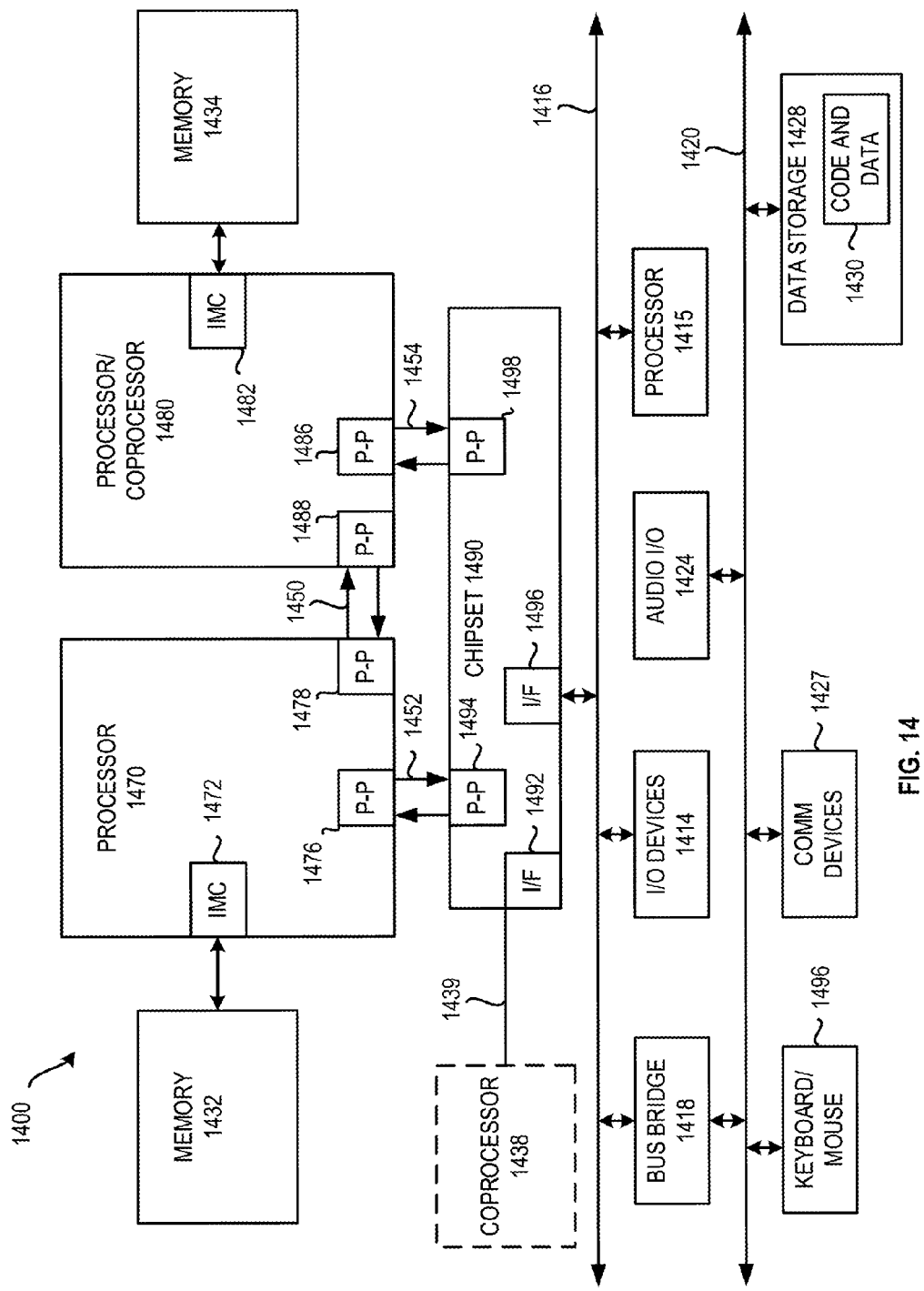
FIG. 14 is a block diagram of a second embodiment of a computer architecture.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
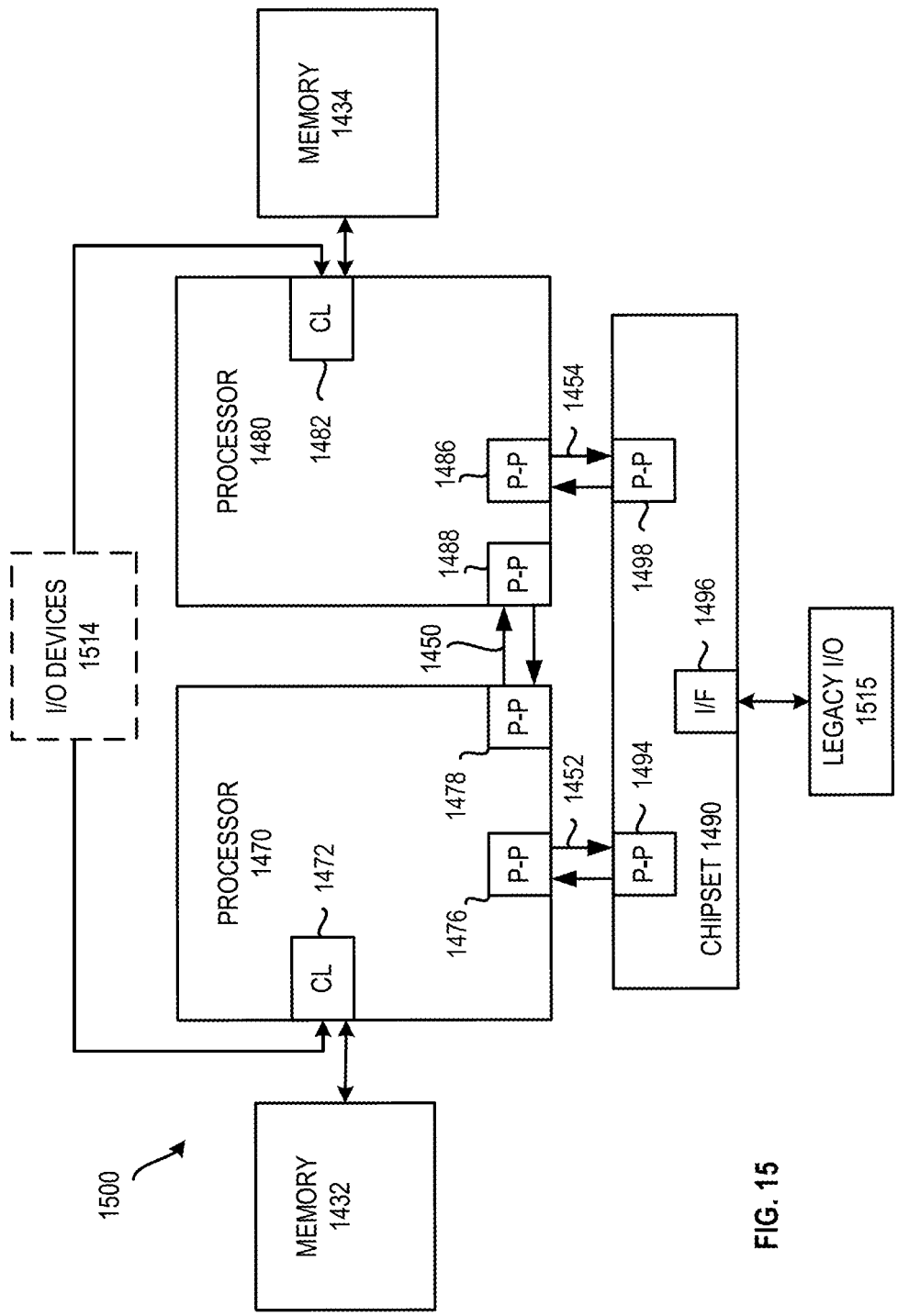
FIG. 15 is a block diagram of a third embodiment of a computer architecture.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
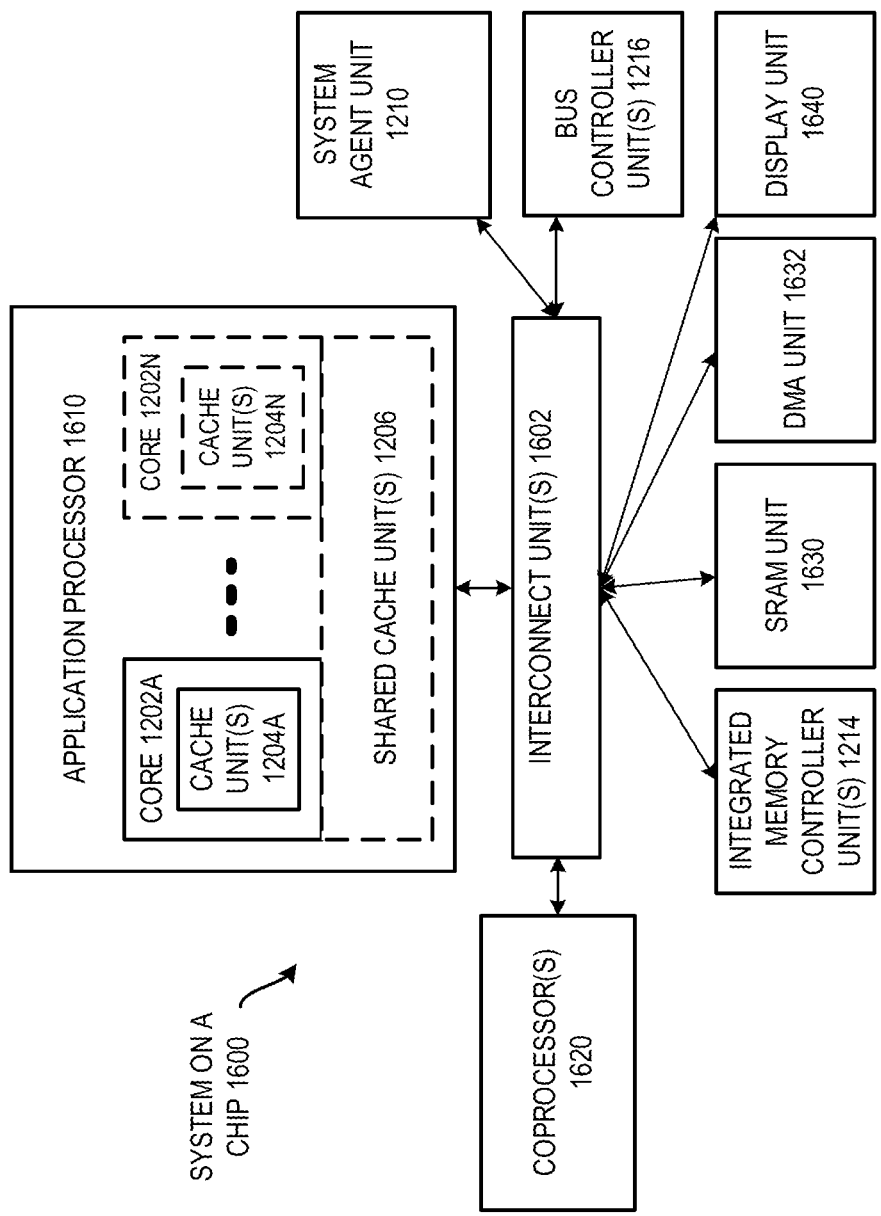
FIG. 16 is a block diagram of an embodiment of a system-on-a-chip architecture.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
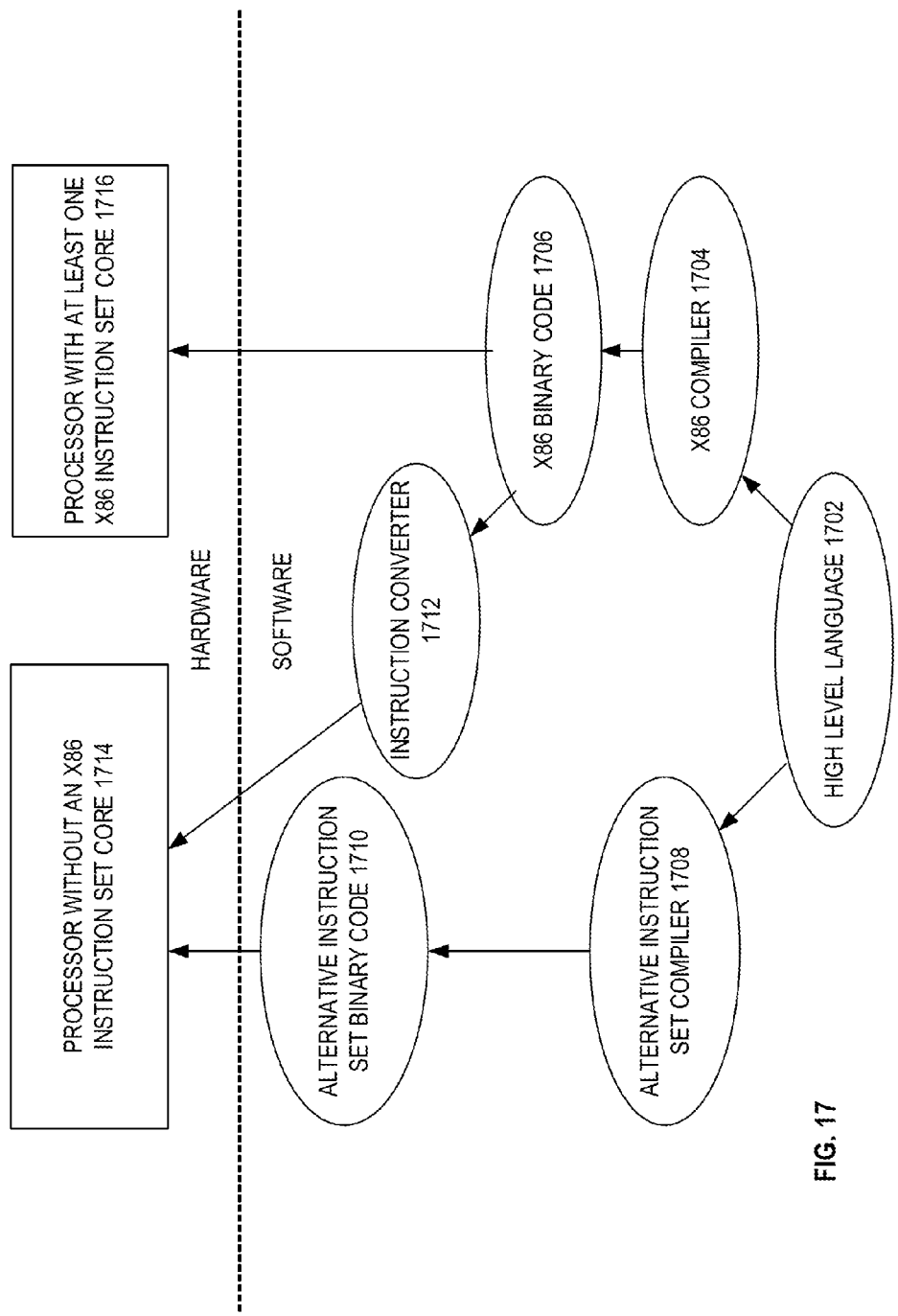
FIG. 17 is a block diagram of use of a software instruction converter to convert binary instructions in a source instruction set to binary instructions in a target instruction set, according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Components, features, and details described for any of FIGS. 3-8 may also optionally be used in any of FIGS. 1-2. Moreover, components, features, and details described herein for any of the apparatus described herein may also optionally be used in and/or apply to any of the methods described herein, which in embodiments may be performed by and/or with such apparatus. Any of the processors described herein may be included in any of the computer systems or other systems disclosed herein. In some embodiments, the computer system may include an interconnect (e.g., point-to-point or multi-drop where more than two chips may be coupled to the interconnect), a processor coupled with the interconnect, and a dynamic random access memory (DRAM) coupled with the interconnect. Alternatively, instead of DRAM, other types of volatile memory that don't need to be refreshed may be used, flash memory may be used, etc. In some embodiments, the processor may be included in a chip that includes an on-chip memory controller, or in other embodiments the memory controller may be included in a separate chip (e.g., a hub chip).

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

In the description and/or claims, the terms "logic," "unit," "module," or "component," may have been used. Each of these terms may be used to refer to hardware, firmware, software, or various combinations thereof. In example embodiments, each of these terms may refer to integrated circuitry, application specific integrated circuits, analog circuits, digital circuits, programed logic devices, memory devices including instructions, and the like, and various combinations thereof. In some embodiments, these may include at least some hardware (e.g., transistors, gates, other circuitry components, etc.).

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Various operations and methods have been described. Some of the methods have been described in a relatively basic form, but operations may optionally be added to and/or removed from the methods. In addition, while a particular order of operations has been shown or described according to embodiments, that order is exemplary. Alternate embodiments may perform the operations in different order, combine certain operations, overlap certain operations, etc.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may store or otherwise provide one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, servers, network devices (e.g., routers and switches), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor or other apparatus that includes a decode unit to decode a thread pause instruction from a first thread, and a back-end portion of the processor coupled with the decode unit. The back-end portion of the processor, in response to the thread pause instruction, is to pause processing of subsequent instructions of the first thread for execution. The subsequent instructions occur after the thread pause instruction in program order. The back-end portion of the processor, in response to the thread pause instruction, is also to keep at least a majority of the back-end portion of the processor, including a plurality of execution units and an instruction queue unit, empty of instructions of the first thread, except for the thread pause instruction, for a predetermined period of time.

Example 2 includes the processor of Example 1, further including a timer, in which the processor, in response to the thread pause instruction, is to initiate the timer after the at least the majority of the back-end portion of the processor is empty of the instructions of the first thread.

Example 3 includes the processor of Example 2, in which the decode unit is to decode the thread pause instruction into a control signal, and in which the back-end portion of the processor is to initiate the timer in response to the control signal being committed.

Example 4 includes the processor of any one of Examples 1 to 3, further including a front-end portion of the processor that includes the decode unit, and in which the back-end portion of the processor, when the at least the majority of the back-end portion of the processor is idle, is to be responsive to the thread pause instruction to signal the front-end portion of the processor that the front-end portion of the processor will not receive events needing attention from the back-end portion of the processor.

Example 5 includes the processor of any one of Examples 1 to 4, further including a memory execution unit, and in which the back-end portion of the processor, when the at least the majority of the back-end portion of the processor is idle, is to be responsive to the thread pause instruction to signal the memory execution unit that the memory execution unit will not receive events needing attention from the back-end portion of the processor.

Example 6 includes the processor of any one of Examples 1 to 5, in which the back-end portion of the processor, in response to the thread pause instruction, is to stall a control signal decoded from the thread pause instruction for the predetermined period of time at a pipeline stage in the back-end portion of the processor.

Example 7 includes the processor of Example 6, in which the pipeline stage is between the decode unit and the execution units.

Example 8 includes the processor of Example 7, in which the pipeline stage includes an allocation unit.

Example 9 includes the processor of any one of Examples 1 to 8, in which the decode unit is to decode the thread pause instruction which is to have an operand to indicate the predetermined period of time.

Example 10 includes the processor of any one of Examples 1 to 8, in which the decode unit is to decode the thread pause instruction into a control signal that is to determine that a relatively simpler implementation of the thread pause instruction is to be used instead of a relatively more elaborate implementation of the thread pause instruction that the processor is also capable of performing.

Example 11 includes the processor of Example 10, in which the processor is capable of virtualization in which performing the thread pause instruction is to cause a virtual machine exit and transactional execution in which performing the thread pause instruction, at least at times, is to cause the transactional execution to be aborted, and in which the control signal is to determine that the relatively simpler implementation is to be used after determining that the virtualization and the transactional execution are not being performed by the processor.

Example 12 includes the processor of any one of Examples 1 to 8, in which the thread pause instruction is to allow the back-end portion of the processor to commit all previous instructions of the first thread, which occur before the thread pause instruction in the program order, prior to starting the predetermined period of time.

Example 13 includes the processor of any one of Examples 1 to 8, in which the predetermined period of time is between 50 and 150 clock cycles.

Example 14 includes a method in a processor that includes receiving a thread pause instruction from a first thread, and pausing processing of subsequent instructions of the first thread for execution in response to the thread pause instruction. The subsequent instructions occurring after the thread pause instruction in program order. The method also includes keeping at least a plurality of execution units and an instruction queue unit of a back-end portion of the processor empty of instructions of the first thread, except for the thread pause instruction, for a fixed duration, in response to the thread pause instruction.

Example 15 includes the method of Example 14, further including determining to gate a clock to the execution units for a period of time that is based on the fixed duration.

Example 16 includes the method of any one of Examples 14 to 15, further including, in response to the thread pause instruction, initiating a timer, after the at least the execution units and the instruction queue unit empty of the instructions of the first thread, except for the thread pause instruction.

Example 17 includes the method of any one of Examples 14 to 16, further including, in response to the thread pause instruction, and after the at least the execution units and the instruction queue unit are idle, transmitting a signal, from the back-end portion to a front-end portion of the processor, to indicate that the back-end portion will not send events needing attention of the front-end portion.

Example 18 includes the method of Example 17, further including the front-end portion of the processor determining to stop a clock based at least in part on the signal.

Example 19 includes the method any one of Examples 14 to 18, further including, in response to the thread pause instruction, determining that a relatively simpler implementation of the thread pause instruction is sufficient, instead of a relatively more elaborate implementation of the thread pause instruction that the processor is also capable of implementing.

Example 20 includes the method of Example 19, in which determining that the relatively simpler implementation of the thread pause instruction is sufficient includes determining at least one of that the processor is not performing virtualization and that the processor is not performing transactional execution.

Example 21 includes the method of Example 14, in which pausing includes stalling a control signal that has been decoded from the thread pause instruction in the back-end portion of the processor for the fixed duration.

Example 22 includes the method any one of Examples 14 to 21, in which receiving includes receiving the thread pause instruction having an operand to indicate the fixed duration.

Example 23 includes a system to process instructions including an interconnect, and a processor coupled with the interconnect. The processor is to receive a thread pause instruction from a first thread. The processor, in response to the thread pause instruction, is to pause processing of subsequent instructions of the first thread for execution. The subsequent instructions occur after the thread pause instruction in program order. The processor is also to keep at least a majority of the back-end portion of the processor, including a plurality of execution units, empty of instructions of the first thread, except for the thread pause instruction, for a fixed duration. The system also includes a dynamic random access memory (DRAM) coupled with the interconnect.

Example 24 includes the system of Example 23, in which the back-end portion of the processor, when the at least the majority of the back-end portion of the processor is idle, is to be responsive to the thread pause instruction to signal a front-end portion of the processor that the back-end portion of the processor will not be sending events needing attention to the front-end portion of the processor.

Example 25 includes an article of manufacture including a non-transitory machine-readable storage medium. The non-transitory machine-readable storage medium stores a thread pause instruction. The thread pause instruction, if executed by a machine, is to cause the machine to perform operations including pausing processing of subsequent instructions of a first thread having the thread pause instruction for execution. The subsequent instructions occurring after the thread pause instruction in program order. The operations also include keeping at least a plurality of execution units and an instruction queue unit of a back-end portion of a processor empty of instructions of the first thread, except for the thread pause instruction, for a predetermined period of time, in response to the thread pause instruction.

Example 26 includes the article of Example 25, in which the thread pause instruction, if executed by the machine, is to cause the machine to determine that a relatively simpler implementation of the thread pause instruction is sufficient, instead of a relatively more elaborate implementation of the thread pause instruction that the processor is also capable of implementing.

Example 27 includes a processor or other apparatus that is operative to perform the method of any one of Examples 14-22.

Example 28 includes a processor or other apparatus that includes means for performing the method of any one of Examples 14-22.

Example 29 includes a processor that includes any combination of modules, units, logic, circuitry, and means to perform the method of any one of Examples 14-22.

Example 30 includes an article of manufacture that includes an optionally non-transitory machine-readable medium that optionally stores or otherwise provides an instruction that if and/or when executed by a processor, computer system, or other machine is operative to cause the machine to perform the method of any one of Examples 14-22.

Example 31 includes a computer system or other electronic device including an interconnect, the processor of any one of Examples 1-13 coupled with the interconnect, and at least one component coupled with the interconnect that is selected from a dynamic random access memory (DRAM), a network interface, a graphics chip, a wireless communications chip, a Global System for Mobile Communications (GSM) antenna, a phase change memory, and a video camera.

Example 32 includes a processor or other apparatus substantially as described herein.

Example 33 includes a processor or other apparatus that is operative to perform any method substantially as described herein.

Example 34 includes a processor or other apparatus including means for performing any method substantially as described herein.

Example 35 includes a processor or other apparatus that is operative to perform any thread pause instruction substantially as described herein.

Example 36 includes a processor or other apparatus including means for performing any thread pause instruction substantially as described herein.

Example 37 includes a computer system or other electronic device that includes a processor having a decode unit that is operable to decode instructions of a first instruction set, and having one or more execution units. The computer system also includes a storage device coupled to the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when executed by the processor, are operable to cause the processor to perform the method of any one of Examples 14-22.

What is claimed is:

1. A processor comprising:
   a decode unit to decode a thread pause instruction from a first thread, wherein the decode unit is to decode the thread pause instruction into a control signal that is to determine that a relatively simpler implementation of the thread pause instruction is to be used instead of a relatively more elaborate implementation of the thread pause instruction that the processor is also capable of performing, wherein the relatively more elaborate implementation is to determine whether an architectural feature is currently being utilized but the relatively simpler implementation is not to; and
   a back-end portion of the processor coupled with the decode unit, the back-end portion of the processor, in response to the thread pause instruction, to:
     pause processing of subsequent instructions of the first thread for execution, wherein the subsequent instructions occur after the thread pause instruction in program order, and wherein the pause of the processing of the subsequent instructions is initially to occur in a back-end portion of the processor; and
     keep at least a majority of the back-end portion of the processor, including a plurality of execution units and an instruction queue unit, empty of instructions of the first thread, except for the thread pause instruction, for a predetermined period of time.

2. The processor of claim 1, further comprising a front-end portion of the processor that includes the decode unit, and wherein the back-end portion of the processor, when said at least the majority of the back-end portion of the processor is idle, is to be responsive to the thread pause instruction to signal the front-end portion of the processor that the front-end portion of the processor will not receive events needing attention from the back-end portion of the processor.

3. The processor of claim 1, further comprising a memory execution unit, and wherein the back-end portion of the processor, when said at least the majority of the back-end portion of the processor is idle, is to be responsive to the thread pause instruction to signal the memory execution unit that the memory execution unit will not receive events needing attention from the back-end portion of the processor.

4. The processor of claim 1, wherein the decode unit is to decode the thread pause instruction which is to have an operand to indicate the predetermined period of time.

5. The processor of claim 1, wherein the processor is capable of virtualization in which performance of the thread pause instruction is to cause a virtual machine exit and transactional execution in which performance of the thread pause instruction, at least at times, is to cause the transactional execution to be aborted, and wherein the control signal is to determine that the relatively simpler implementation is to be used after determining that the virtualization and the transactional execution are not being performed by the processor.

6. The processor of claim 1, wherein the predetermined period of time is between 50 and 150 clock cycles.

7. The processor of claim 1, wherein the predetermined period of time is to be stored in a register of the processor.

8. The processor of claim 1, wherein the predetermined period of time is to be at least one of specified by the thread pause instruction and specified by a value that is to be stored in a storage of the processor.

9. A method in a processor comprising:
receiving a thread pause instruction from a first thread;
in response to the thread pause instruction, determining that a relatively simpler implementation of the thread pause instruction is sufficient, instead of a relatively more elaborate implementation of the thread pause instruction that the processor is also capable of implementing, wherein the relatively more elaborate implementation is to perform at least one check that is not to be performed by the relatively simpler implementation;
pausing processing of subsequent instructions of the first thread for execution starting in a back-end portion of the processor in response to the thread pause instruction, the subsequent instructions occurring after the thread pause instruction in program order; and
keeping at least a plurality of execution units and an instruction queue unit of a back-end portion of the processor empty of instructions of the first thread, except for the thread pause instruction, for a fixed duration, in response to the thread pause instruction, wherein the fixed duration is to be at least one of specified by the thread pause instruction and specified by a value that is to be stored in a storage of the processor.

10. The method of claim 9, wherein said determining that the relatively simpler implementation of the thread pause instruction is sufficient comprises determining at least one of that the processor is not performing virtualization and that the processor is not performing transactional execution.

11. An article of manufacture comprising a non-transitory machine-readable storage medium, the non-transitory machine-readable storage medium storing a thread pause instruction, the thread pause instruction if executed by a machine is to cause the machine to perform operations comprising to:
determine that a relatively simpler implementation of the thread pause instruction is sufficient, instead of a relatively more elaborate implementation of the thread pause instruction that a processor is also capable of implementing, wherein the relatively more elaborate implementation is to determine whether at least one of virtualization and transactional execution is being used but the relatively simpler implementation is not to;
pause processing of subsequent instructions of a first thread having the thread pause instruction for execution starting in a back-end portion of the processor, the subsequent instructions occurring after the thread pause instruction in program order; and
keep at least a plurality of execution units and an instruction queue unit of a back-end portion of a processor empty of instructions of the first thread, except for the thread pause instruction, for a predetermined period of time, in response to the thread pause instruction, wherein the predetermined period of time is to be at least one of specified by the thread pause instruction and specified by a value that is to be stored in a storage of the machine.

12. A processor comprising:
a decode unit to decode a thread pause instruction from a first thread, wherein the decode unit is to decode the thread pause instruction into a control signal that is to determine that a relatively simpler implementation of the thread pause instruction is to be used instead of a relatively more elaborate implementation of the thread pause instruction that the processor is also capable of performing, wherein the relatively more elaborate implementation is to perform an operation associated with at least one of virtualization and transactional execution that is not to be performed by the relatively simpler implementation; and
a back-end portion of the processor coupled with the decode unit, the back-end portion of the processor, in response to the thread pause instruction, to:
pause processing of subsequent instructions of the first thread for execution, wherein the subsequent instructions occur after the thread pause instruction in program order; and
keep at least a majority of the back-end portion of the processor, including a plurality of execution units and an instruction queue unit, empty of instructions of the first thread, except for the thread pause instruction, for a period of time.

* * * * *